(12) United States Patent
Fedele et al.

(10) Patent No.: US 8,538,095 B2
(45) Date of Patent: Sep. 17, 2013

(54) METHOD AND APPARATUS FOR PROCESSING BIOMETRIC IMAGES

(75) Inventors: Vincent Fedele, Harvard, MA (US); John S. Berg, Franklin, MA (US); Christopher J. Butler, Acton, MA (US); Robert David Farraher, Somerville, MA (US)

(73) Assignee: Aprilis, Inc., Maynard, MA (US)

( * ) Notice: Subject to any disclaimer, the term of this patent is extended or adjusted under 35 U.S.C. 154(b) by 1731 days.

(21) Appl. No.: 10/561,647

(22) PCT Filed: Jun. 21, 2004
(Under 37 CFR 1.47)

(86) PCT No.: PCT/US2004/019713
§ 371 (c)(1),
(2), (4) Date: Feb. 2, 2009

(87) PCT Pub. No.: WO2005/001752
PCT Pub. Date: Jan. 6, 2005

(65) Prior Publication Data
US 2009/0226052 A1    Sep. 10, 2009

Related U.S. Application Data

(60) Provisional application No. 60/480,008, filed on Jun. 21, 2003, provisional application No. 60/519,792, filed on Nov. 13, 2003, provisional application No. 60/523,068, filed on Nov. 18, 2003.

(51) Int. Cl.
*G06K 9/48* (2006.01)
*G06K 9/40* (2006.01)

(52) U.S. Cl.
USPC .......................... 382/124; 382/199; 382/254

(58) Field of Classification Search
USPC ................. 382/118–128, 162–167, 168–172, 382/190, 199, 254, 305
See application file for complete search history.

(56) References Cited

U.S. PATENT DOCUMENTS

| 4,262,623 A | 4/1981 | Smith, III et al. |
| 4,544,267 A | 10/1985 | Schiller |

(Continued)

FOREIGN PATENT DOCUMENTS

| WO | WO02/15118 A1 | 2/2002 |
| WO | WO02/088878 A2 | 11/2002 |

OTHER PUBLICATIONS

Georges, M. P., et al., "Compact and Portable Holographic Camera Using Photorefractive Crystals. Application in Various Metrological Problems," *Appl. Phys. B*, 72: 761-765 (Apr. 20, 2001).

(Continued)

*Primary Examiner* — Sheela Chawan
(74) *Attorney, Agent, or Firm* — Fish & Richardson P.C.

(57) ABSTRACT

A method and apparatus for applying gradient edge detection to detect features in a biometric, such as a fingerprint, based on data representing an image of at least a portion of the biometric. The image is modeled as a function of the features. Data representing an image of the biometric is acquired, and features of the biometric are modeled for at least two resolutions. The method and apparatus improves analysis of both high-resolution images of biometrics of friction ridge containing skin that include resolved pores and lower resolution images of biometrics without resolved pores.

182 Claims, 24 Drawing Sheets

(56) References Cited

U.S. PATENT DOCUMENTS

| | | |
|---|---|---|
| 4,643,515 A | 2/1987 | Upatnieks |
| 4,728,186 A | 3/1988 | Eguchi et al. |
| 4,737,001 A | 4/1988 | Moss |
| 4,790,564 A | 12/1988 | Larcher et al. |
| 5,077,803 A | 12/1991 | Kato et al. |
| 5,088,817 A | 2/1992 | Igaki et al. |
| 5,096,290 A | 3/1992 | Ohta |
| 5,109,427 A | 4/1992 | Yang |
| 5,177,353 A | 1/1993 | Schiller |
| 5,177,802 A | 1/1993 | Fujimoto et al. |
| 5,241,606 A | 8/1993 | Horie |
| 5,295,208 A | 3/1994 | Caulfield et al. |
| 5,465,311 A | 11/1995 | Caulfield et al. |
| 5,488,659 A | 1/1996 | Miliani |
| 5,515,184 A | 5/1996 | Caulfield et al. |
| 5,629,764 A | 5/1997 | Bahuguna et al. |
| 5,631,971 A | 5/1997 | Sparrow |
| 5,736,734 A | 4/1998 | Marcus et al. |
| 5,737,071 A | 4/1998 | Arndt |
| 5,824,474 A | 10/1998 | Matsuhisa et al. |
| 5,854,697 A | 12/1998 | Caulfield et al. |
| 5,879,454 A | 3/1999 | Peng |
| 5,892,599 A | 4/1999 | Bahuguna |
| 5,926,555 A | 7/1999 | Ort et al. |
| 5,974,162 A | 10/1999 | Metz et al. |
| 5,986,746 A | 11/1999 | Metz et al. |
| 6,002,787 A | 12/1999 | Takhar et al. |
| 6,061,463 A | 5/2000 | Metz et al. |
| 6,111,977 A | 8/2000 | Scott et al. |
| 6,115,483 A | 9/2000 | Suga |
| 6,151,142 A | 11/2000 | Phillips et al. |
| 6,154,285 A | 11/2000 | Teng et al. |
| 6,178,255 B1 | 1/2001 | Scott et al. |
| 6,236,090 B1 | 5/2001 | Fujisawa |
| 6,301,368 B1 | 10/2001 | Bolle et al. |
| 6,341,028 B1 | 1/2002 | Bahuguna et al. |
| 6,411,728 B1 | 6/2002 | Lee et al. |
| 6,483,932 B1 | 11/2002 | Martinez et al. |
| 6,628,813 B2 | 9/2003 | Scott et al. |
| 6,658,164 B1 | 12/2003 | Irving et al. |
| 6,661,631 B1 | 12/2003 | Meador et al. |
| 6,665,427 B1 | 12/2003 | Keagy et al. |
| 6,687,391 B1 | 2/2004 | Scott et al. |
| 7,359,553 B1 * | 4/2008 | Wendt et al. ............ 382/192 |
| 7,728,959 B2 | 6/2010 | Waldman et al. |
| 2003/0089702 A1 | 5/2003 | Carver et al. |
| 2003/0229506 A1 | 12/2003 | Scott et al. |
| 2006/0119837 A1 | 6/2006 | Raguin et al. |

OTHER PUBLICATIONS

Jiang, X., et al., "Detecting the Fingerprint Minutiae by Adaptive Tracing the Gray-Level Ridge", Pattern Recognition, Elsevier, Kidlington, GB, 34, No. 5: 999-1013 (May 5, 2001).

Vizcaya, P. R., et al., "Multi-Resolution Fuzzy Approach for Singularity Detection in Fingerprint Images", Proceedings of the SPIE, SPIE, Bellingham, VA, pp. 46-56, (Nov. 19, 1996).

U.S. Notice of Allowance dated Jan. 14, 2012 issued in U.S. Appl. No. 10/561,646.

U.S. Office Action dated Sep. 4, 2009 issued in U.S. Appl. No. 10/561,646.

* cited by examiner

METHOD AND APPARATUS FOR PROCESSING BIOMETRIC IMAGES

RELATED APPLICATION(S)

This application is the U.S. National Stage of International Application No. PCT/US2004/019713, filed Jun. 21, 2004, published in English, and claims priority under 35U.S.C. §119 or 365 to U.S. Provisional Application No. 60/480,008, filed on Jun. 21, 2003, U.S. Provisional Application No. 60/519,792, filed on Nov. 13, 2003 and U.S. Provisional Application No. 60/523,068, filed on Nov. 18, 2003. This application is related to the PCT Application entitled "Acquisition of High Resolution Biometric Images" filed on Jun. 21, 2004, International Application No. PCT/US2004/019917. The entire teachings of the above applications are incorporated herein by reference.

BACKGROUND OF THE INVENTION

Growing concerns regarding domestic security have created a critical need to positively identify individuals as legitimate holders of credit cards, driver's licenses, passports and other forms of identification. The ideal identification process is reliable, fast, and relatively inexpensive. It should be based on modern, high-speed, electronic devices that can be networked to enable fast and effective sharing of information. It should also be compact, portable, and robust for convenient use in a variety of environments, including airport security stations, customs and border crossings, police vehicles, point of sale applications, credit card and ATM applications, home and office electronic transactions, and entrance control sites to secure buildings.

A well established method for identification or authentication is to compare biometric characteristics of an individual with a previously obtained authentic biometric of the individual. Possible biometric characteristics include ear shape and structure, facial characteristics, facial or hand thermograms, iris and retina structure, handwriting, and friction ridge patterns of skin such as fingerprints, palm prints, foot prints, and toe prints. A particularly useful biometric system uses fingerprints for individual authentication and identification. (Maltoni, Maio, Jain, and Prabhakar, "Handbook of Fingerprint Recognition", Springer, 2003, chapter 1, and David R. Ashbaugh, "Quantitative-Qualitative Friction Ridge Analysis", CRC Press, 1999).

Fingerprints have traditionally been collected by rolling an inked finger on a white paper card. Since this traditional process clearly fails to meet the criteria listed above, numerous attempts have been made to develop an electronically imaged fingerprint method to address new security demands. These modern methods typically use, as a key component, a solid-state device such as a capacitive or optical sensor to capture the fingerprint image in a digital format. By using a solid-state imager as part of a fingerprint identification apparatus, a fingerprint can be collected conveniently and rapidly during a security check, for example, and subsequently correlated, in near real-time, to previously trained digital fingerprints in an electronic database. The database can reside on a computer at the security check point, on a secure but portable or removable storage device, on a remotely networked server, or as a biometric key embedded into a smartcard, passport, license, birth certificate, or other form of identification.

The topological features of a typical finger comprise a pattern of ridges separated by valleys, and a series of pores located along the ridges. The ridges are typically 100 to 300 $\mu m$ wide and can extend in a number of different swirl-like patterns for several mm to one or more cm. The ridges are separated by valleys with a typical ridge-valley period of approximately 250-500 $\mu m$. Pores, roughly circular in cross section, range in diameter from about 40 $\mu m$ to 200 $\mu m$, and are aligned along the ridges. The patterns of both ridges/valleys and pores are believed to be unique to each fingerprint. No currently available commercial fingerprint acquisition technique is able to resolve pores and ridge deviation details to a degree necessary to use this vastly larger amount of information as a biometric key. Accordingly, present-day automatic fingerprint identification procedures use only portions of ridge and valley patterns, called minutiae, such as ridge ending-points, deltoids, bifurcations, crossover points, and islands, which are found in almost every fingerprint (Maltoni, Maio, Jain, and Prabhakar, "Handbook of Fingerprint Recognition", Springer, 2003, chapter 3). Extraction and comparison of minutiae is the basis of most current automatic fingerprint analysis systems.

There are several important limitations with minutiae-based methods of automatic fingerprint analysis. In order to collect enough minutiae for reliable analysis a relatively large area, at least 0.50×0.50 inches, good quality, fingerprint, or latent image of a fingerprint must be available. Large prints are often collected by rolling an inked finger on a white card, and subsequently scanning the inked image into an electronic database. This manual procedure is an awkward and time consuming process that requires the assistance of a trained technician. Automated methods for collecting large fingerprints usually require mechanically complicated and expensive acquisition devices. Large area fingerprints suffer from distortions produced by elastic deformations of the skin so that the geometrical arrangements between minutiae points vary from image to image of the same finger, sometimes significantly. In addition, forensic applications can involve small, poor quality, latent prints that contain relatively few resolved minutiae so that reliable analysis based on a limited number of minutiae points is quite difficult.

Minutiae comparison ignores a significant amount of structural information that may be used to enhance fingerprint analysis. Since the typical fingerprint contains between 7 to 10 times as many pores as minutiae, techniques that include both pores and minutiae should greatly improve matching compared to techniques that use only minutiae. This highly detailed information is referred to in the industry as "level three detail," and is the basis of most forensic level analysis of latent images left at a crime scene, where the latent does not contain enough minutiae to make an accurate identification. Stosz and Alyea (J. D. Stosz, L. A. Alyea, "Automated system for fingerprint authentication using pores and ridge structures", Proc. SPIE, vol 2277, 210-223, 1994) have confirmed this expectation by showing that the use of pores combined with minutiae improves the accuracy of fingerprint matching and allows successful analysis of relatively small prints. Their image sensor used a common prism-based configuration, a high-resolution Charge Coupled Device (CCD) video camera, and a macro lens to provide the resolution needed to image pores. After acquisition, the gray-scale images are converted to a binary format and then processed further to produce a skeleton image from which minutiae and pores are identified. Fingerprints are compared by independent correlations between pores and minutiae extracted from the various images.

SUMMARY OF THE INVENTION

There is a need for a procedure that improves an analysis of both high-resolution images of biometrics (e.g., fingerprints that include resolved pores) and lower resolution images of biometrics (e.g., fingerprints without resolved pores). The principles of the present invention fulfill this need by using identifying information in a biometric, which, in the case of a fingerprint, can include fingerprint ridge shapes or profiles in addition to usual ridge contours and the position, shape, and sizes of pores. Images to be analyzed may include biometric images, such as fingerprints, (i) from an apparatus custom-designed to capture such images either in real-time or non-real-time, or (ii) from other apparatus (e.g., computer scanner) that scans crime scene latent images, as well as existing criminal arrest or civil-applicant background check records.

Accordingly, one embodiment of the principles of the present invention includes a method and apparatus for processing an image of a biometric, which, for purposes of illustration only, is described in detail herein in reference to acquiring and processing an image of a fingerprint. The method and apparatus, referred to generally here as "system," may apply a gradient edge detection process to detect features in a biometric based on data representing an image of at least a portion of the fingerprint. The system models the image as a function of the fingerprint features, which may include level three features. The models may be referred to herein as "trained" models.

The system may construct a model for at least two resolutions: a low resolution "outline" model and a high resolution "details" model. The outline model may generally show an edge topology of ridge features; the details model generally shows edge topology and specific ridge deviations and locations and sizes of pores. The system may also construct a model for a third resolution, a "fine details" model. The fine details model is used for precisely defining and locating particular biometric features more accurately than at the low or high resolutions, such as pores in a fingerprint image. It is this third resolution model that is used, for example, for pore matching in authentication and identification processes in a fingerprint application.

In constructing the model of a fingerprint, the system may identify, outline, and extract ridge deviation detail and pore features. The ridge deviation detail may include ridge contours, including scars, and the pore features may include position, shape, and sizes of pores.

Biometrics for which the system is adapted to acquire, model, preprocess, and process may include: ear shape and structure, facial or hand thermograms, iris or retina structure, handwriting, and friction ridge patterns of skin such as fingerprints, palm prints, foot prints, and toe prints.

The system may construct models at various resolution levels through a process of binning the original image data. In this process, the image data is divided into equal-sized, sub arrays of pixels. Each pixel sub array is subsequently represented in the model by a single pixel whose value is equal to the average pixel value in the corresponding sub array. The sizes of the sub arrays can be adjusted by a user of the software to any appropriate value; typical examples follow for a CMOS or CCD sensor array, described below in reference to FIG. 4, and having an array of 1024×1280 6 µm square pixels. "Outline" resolution models may be constructed with a sub-arrays having a relatively large numbers of pixels, for example 10 to 15, "details" resolution models may be constructed with sub arrays having a relatively small number of pixels, for example 5 to 10, and "fine details" models may be constructed with sub-arrays having even fewer pixels, for example 2 to 5. The fine details model may be used to locate and define particular biometric features more accurately than at the low or high resolution; for example, in the case of fingerprints, pores on ridges may be located and defined in the fine details model.

The gradient determined by the gradient edge detection process may be estimated for each pixel of the model after applying a noise filter to the image. The detection process may use a finite-differences process. The detection process may also include a series of steps, such as the following: (a) after calculating the gradients, identifying and marking an image point as an edge point having a locally maximal gradient in the direction of the gradient that exceeds a threshold; (b) identifying neighboring edge points by finding nearest pixels to the original edge point that lie in a direction that is approximately perpendicular to the gradient direction that passes through the first edge point; (c) for the nearest pixels, determining gradient values and, for the pixel with a gradient that is maximal along its gradient direction and has a value that exceeds a threshold, assigning the pixel to be the next edge point; (d) continuing either until the edge is terminated or the edge closes with itself to form a continuous curve; (e) terminating the process at the previously determined edge point if the gradient of a candidate edge point is less than the threshold; and (f) repeating the process until all potential edge points have been considered.

The system may automatically distinguish biometric features from noise. In one embodiment, the noise is defined as features that have less than a minimum width or extend less than a minimum distance. In addition to automatically distinguishing the biometric features from noise, the system may also support manual editing of features and/or manual selection of features that must be present for a successful match.

The system may model multiple regions of a single image of the portion of the biometric. For example, the models may be models of five regions of the biometric, such as four quadrants of the biometric with small overlaps in each quadrant, and may also include a center portion that overlaps portions of each of the four quadrants. The system may allow a user to add, extend, or delete features and may allow a user to identify specific or unique features that must be present for a match. The system may also allow a user to adjust the size or position of the model(s) relative to the biometric. User interaction may be performed through a Graphical User Interface (GUI) supported by the system.

A useful aspect of this technique for edge detection is an ability to detect edges even if a portion or all of the image is significantly over and/or underexposed, as a few levels of gray difference are sufficient to determine a location of an edge. This allows for highly accurate matching even if the incoming image or portion of the image for comparison is not properly exposed, which allows for minimal or no exposure correction.

The image may be a previously stored image, and the system may normalize the scale or size of the previously stored image so that the scale is similar to that of the trained model(s). This scaling calibration also allows highly accurate measurements to be taken for forensic purposes. Typical accuracy of such measurements may be better than 10 um.

In the case where the biometrics are fingerprints, the fingerprint features may include ridge structure with ridge deviation detail. Further, for fingerprints and other biometrics, the system may display the image to a user with an overlay of indications of the biometric features on the image or filtered biometric features according to a selectable criteria. Also, the system may automatically rotate the image to a specified orientation for displaying to a user and can rotate and scale the image while performing a match. In one embodiment, the image is a gray-scale image, and the gradient edge detection process is a gray-scale gradient edge detection process.

The system may also include a database and add the image of a biometric or portion thereof to the database. The system may store the image and the model of the image in the database. The image may be stored at full sampled resolution in the database or be compressed prior to being stored in the database. Preferably, if the image is compressed, the system compresses it in a lossless manner. The model may also be compressed prior to being stored in the database. The system may also encrypt the data or the model prior to storing them in the database.

The system may also store additional information with the image and/or model in the database. For example, the associated information may include at least one of the following: identity of a person associated with the biometric; manufacturer, model, or serial number of the instrument supplying the data representing the biometric; the date and/or time of imaging the biometric; calibration data associated with the instrument used to acquire the biometric; temperature at the time the image was acquired; unique computer ID of the computer receiving image data from the instrument acquiring the image of the biometric; or name of person logged onto the computer at the time the image was acquired. The associated information may also include a photograph, voice recording, or signature of the person whose biometric is imaged. The associated information may also be a watermark, where the watermark may be identifying information (e.g., associated information as described above) or anti-tampering information to determine whether the image and/or model has been compromised. If compromised, the image and model are typically marked or removed from the database.

The system may also include techniques for authenticating and/or identifying the person whose biometric is acquired. For example, the system may compare a previously stored model from a database to a present image, where the biometric is of a person having a known identity or an unknown identity. A "previously stored model" may be a model that has been stored, for example in a local or remote database, or is a model of a previously acquired image that has not been stored per se Similar usage of the "previously stored image" also applies herein. The present image may be a live image, an image previously stored in a local or remote database, a scanned image, or an image from another source, e.g., the National Institute of Standards and Technology (NIST) or Federal Bureau of Investigation (FBI) database. The system may compare the biometric features in at least two steps: comparing outline features and, if a candidate match is determined, comparing details features, and, if still a candidate match, then comparing pore features. In comparing outline features, the system may compare outline features of the previously stored model to outline features of the present image to determine (i) whether the present image is a candidate for a match or (ii) whether the previously stored model is a candidate for a match. In comparing the outlines features, the system may determine whether the comparison exceeds a predetermined candidate threshold. If the present image is not a candidate for a match, the system may compare outline features of a next previously stored model to the outline features of the present image to determine whether the present image is a candidate for a match and use the next previously stored model for details comparison if it is a match. If the previously stored model is not a candidate for a match, the system may compare outline features of a next previously stored model to the outline features of the present image to determine whether the next previously stored model is a candidate for a match and, if it is a match, the system may use the next previously stored model for details comparison.

If the system determines a candidate match of outlines features is found, the system may compare details features of the previously stored model with detailed features of the present image. The system may compare the details features by determining whether the details comparison exceeds a predetermined threshold or may determine whether required features associated with the previously stored model are found in the present image. In the case of biometrics related to friction ridge containing skin, the system may also determine whether pore features in the previously stored model are found in the present image. If so, the system may indicate which pores in the previously enrolled (i.e., acquired and modeled) image appear in the expected location in the present image, including allowance for distortions that normally occur between successive impressions, and may also show a pore count or a statistical probability of an error in such a match. The system, in comparing the outline, details, required details, and pore features, may determine whether the comparison meets a predetermined level of a number of consecutive frames in which the various features thresholds have been met, in order to call the comparison a match. The individual details and/or pores from successive frames need not be the same details and pores (unless specified as required) but could be different, but also exceeding the threshold(s). Further, the system may select another previously stored model for correlating with the feature set of the present image, and a successful match declared if any model or models exceed the threshold(s).

The system may also scale and/or rotate the previously stored model(s) present image, or model of the present image for use in comparing the two.

The system may also adaptively adjust the previously stored model(s) to account for variability associated with recording or acquiring the present image due to elasticity of the skin. For example, the variability may include stretching of the fingerprint, or portions thereof, laterally, longitudinally, or radially. The variability may also be caused by pressure of the fingerprint on a medium used to record or acquire the present image. In addition, this adaptive conformity may also take into account an expected location of ridge deviation details and, optionally, pore details.

The system may also compare the previously stored model against multiple present images until a match is found or comparison with the multiple present images is complete. In another embodiment, the system may compare multiple previously stored models against the present image until a match is found or comparison with the multiple previously stored models is complete. In yet another embodiment, the system may compare multiple previously stored models against multiple present images until a match is found or comparison among the multiple present images and the multiple previously stored models is complete.

In some embodiments, the present image includes multiple fingerprints of an individual. For example, between two and ten fingerprint images of an individual may be captured and modeled.

The system may also provide for preprocessing of the data representing the image. The preprocessing may include sub-sampling the image to capture the data. The preprocessing may also include decimating the data representing the image, where decimating may include removing every other row and every other column of the data. The system may also preprocess the data by binning the data, which includes averaging multiple "nearby" pixels to reduce the data to a predetermined size. The system may also correct for uneven imaging of the fingerprint, sometimes referred to as "flattening the field." Flattening the field compensates for light source properties, optics variations, Holographic Optical Element (HOE) variations, and differences among the gain and/or offsets of the pixels in a sensor array used to image the fingerprint. The system may also account for defective pixels in the sensor array, for example, by averaging pixel values around a defective pixel to determine a corrected intensity value of the defective pixel. The location and description of defective pixels may be provided by the manufacturer of the sensor array or measured during sensor assembly and stored in system memory for use during calibration of the fingerprint sensor.

The preprocessing may also include encrypting the data representing the image. The preprocessing may also include changing the image orientation, such as horizontal or vertical flip and rotation, or a combination of the two. The system may also apply a watermark to the data representing the image or the system may attach acquire information, such as information about the instrument acquiring the image representing the biometric, to the data representing the image. The watermark may contain information and also may be used as a tamper-proofing technique, ensuring that a modified image is identified or not allowed to be used.

Another embodiment of the system according to the principles of the present invention includes an acquisition unit that acquires data representing an image of a biometric. The acquisition may be a biometric sensor to acquire live scan images, a photograph scanner to scan paper prints of biometrics, a computer modem to receive data from a database of biometric images, or other electronic medium performing similar functions. The system also includes a modeler that models features of the fingerprint utilizing at least two levels of image resolution.

Various example embodiments of the instrument used to acquire images of biometrics are described herein. The embodiments may also include alternative embodiments, such as those disclosed in a related application, entitled "Acquisition of High Resolution Biometric Images," Attorney Docket No. 3174.1012-004, being filed concurrently herewith. The entire teachings of the related application are incorporated herein by reference.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention for a fingerprint biometric follows. It should be understood that the principles of the present invention and example preferred embodiments of the methods and apparatus described below may be applied to other biometrics, including: ear shape and structure, facial or hand thermograms, iris or retina structure, handwriting, and friction ridge patterns of skin such as fingerprints, palm prints, foot prints, and toe prints In general, the principles of the present invention include a procedure that is capable of identifying highly detailed fingerprint features by using gradient edge detection techniques at several image resolutions. The procedure identifies and traces edges of structural features to outline ridges and pores. At sufficiently high resolution, referred to in the industry as "level three details," the ridge outlines contain thousands of structural features that can be used in fingerprint matching. This capability improves matching reliability over systems that reduce ridge patterns to a few minutiae types or systems that consider ridges only as simple contour lines, via a process known as binarization or thinning. Because of the richness of features in fingerprints at high resolution, the procedure also allows for reliable matching of small portions or fragments of prints. In a preferred embodiment, edge detection software is combined with high resolution image acquisition technology that is capable of resolving pores and ridge profiles.

Figure 1:
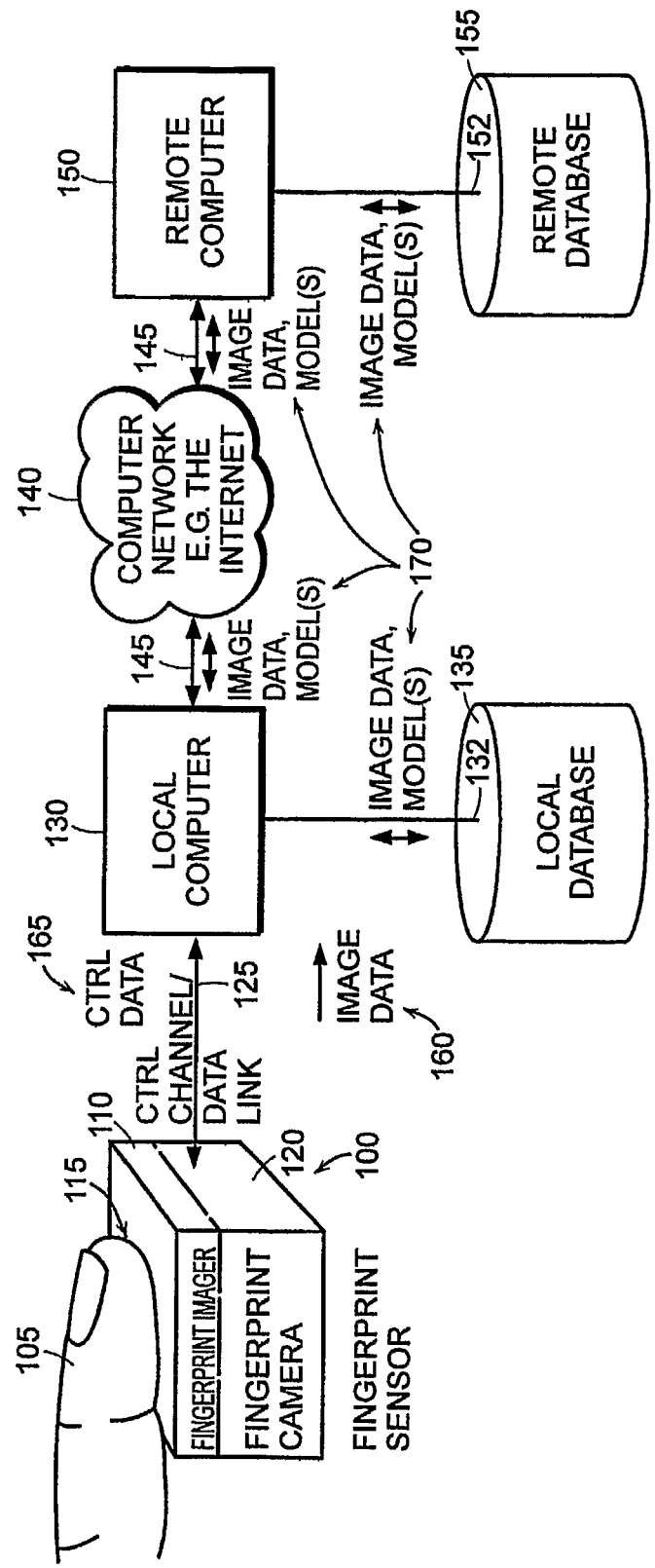
FIG. 1 is a computer network in which a fingerprint sensor according to the principles of the present invention is deployed.

FIG. 1 is a system diagram in which an embodiment of a fingerprint sensor 100 according to the principles of the present invention is employed. The fingerprint sensor 100 includes a fingerprint imager 110 and fingerprint camera 120. The imager 110 and camera 120 may be mechanically, electrically, and optically connected in a single "box." A finger 105 is placed on the fingerprint imager 110 at a "viewable" location by the imager 110 for acquisition of a fingerprint 115 by the camera 120 and for modeling of the fingerprint 115 by processing as described hereinbelow.

For many reasons, it is useful to design the fingerprint sensor 100 in as small a package as possible, such as for use in field operations, security systems, and other applications. However, although packaged in a small size, the fingerprint imager 110 and camera 120 are preferably designed in such a manner as to capture an image of the fingerprint 115 in high resolution. One way to achieve a small packaging size is through novel optical design. For example, the imager 110 may include a Holographic Optical Element (HOE). The HOE allows the fingerprint camera 120 to be positioned close enough to the fingerprint 115 being imaged to receive, without use of large collecting optics, high resolution image features of the fingerprint 115

Although a holographic optical element allows for minimizing the size of the fingerprint imager 110 and, consequently, the fingerprint sensor 100, the HOE is generally temperature sensitive. Therefore, compensating for the temperature sensitivity of the HOE is useful for acquiring accurate, high-resolution images of the fingerprint 115. Compensating for the temperature sensitivity of the HOE can be passive or active and is discussed further beginning in reference to FIG. 2.

Continuing to refer to FIG. 1, the fingerprint camera 120 includes an interface to communicate bidirectionally with a local computer 130 via a control channel/data link 125. The fingerprint camera 120 sends image data 160 to the local computer 130, and the local computer 130 may send control data 165 or other information, including image data 125, to the fingerprint camera 120 or imager 110 via the link 125.

The local computer 130 may include a variety of processing capabilities, such as modeling, authentication, and authorization, that is applied to the image data 160. The local computer 130 may be in communication with a local database 135 via a local link 132. Image data and associated model(s) 170, collectively, are communicated between the local computer 130 and local database 135 via the local link 132. Other data, such as administrative data, may also be communicated over the local link 132 for storage in the local database 135 for later retrieval.

The local computer 130 may also communicate with a remote computer 150 via a computer network 140, such as the Internet. The image data and associated model(s) 170 are communicated via network communications links 145 among the local computer 130, computer network 140, and remote computer 150. The remote computer 150 is in communication with the remote database via a remote database link 152.

The remote computer 150 may include some or all of the processing of the local computer 130 or include other services, such as remote retrieval of image data and associated model(s) 170 from a remote database 155 or authentication of a live scan image of a fingerprint.

Figure 2:
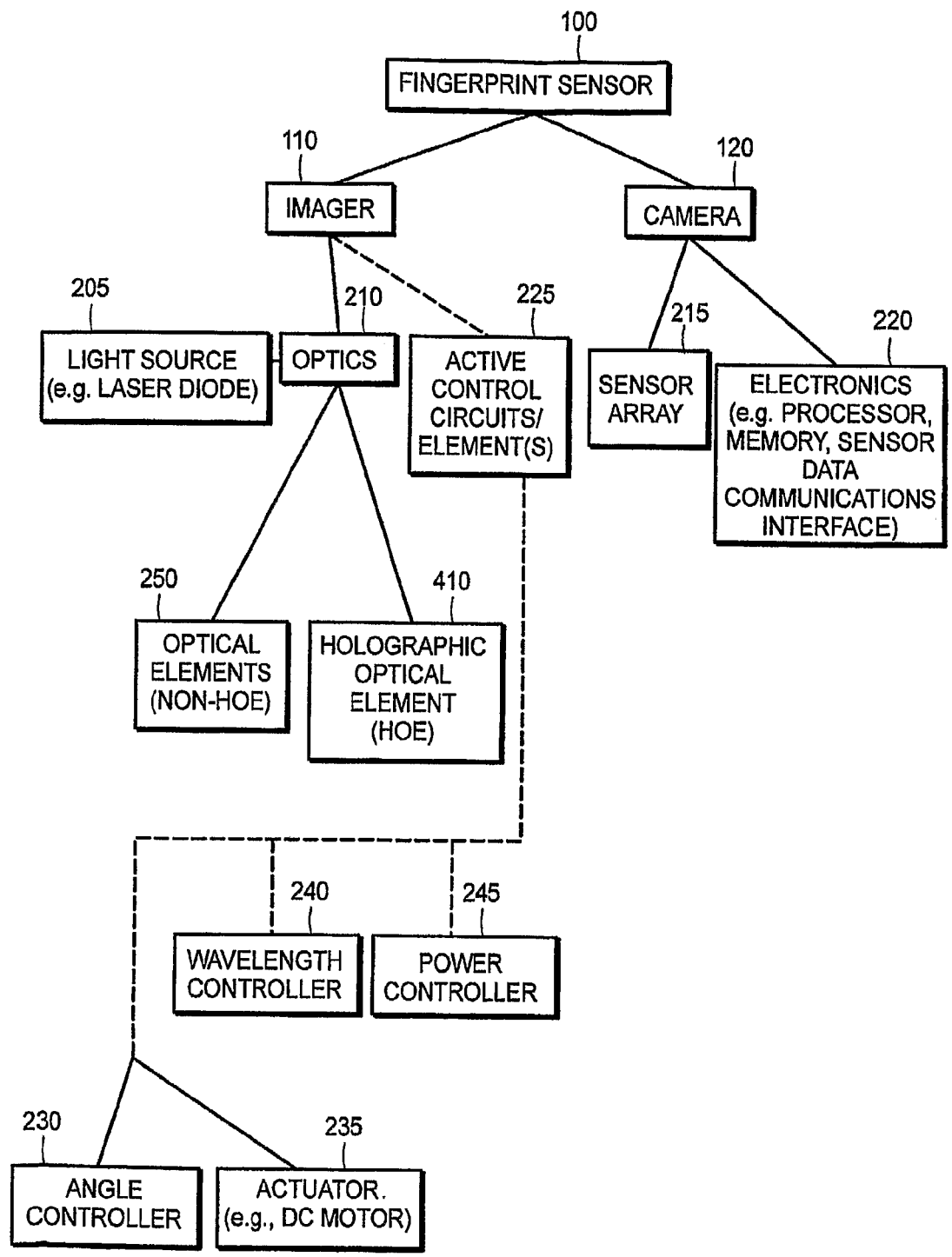
FIG. 2 is a system hierarchical diagram of the fingerprint sensor of FIG. 1.

FIG. 2 is a hierarchical diagram of the fingerprint sensor 100. The fingerprint sensor 100, as discussed in reference to FIG. 1, includes a fingerprint imager 110 and fingerprint camera 120. Each will be discussed in turn.

The fingerprint imager 110 includes, optics 210, and, optionally, active control circuits/element(s) 225. The optics 210 includes a light source 205, optical elements 250, which are non-HOE's such as a waveguide and lens(es), and at least one HOE 410, which includes a hologram.

The light source provides a collimated and expanded beam of light 207. The light source includes one or more beam shaping optical elements, and may include a coherent source, such as a laser diode, which works efficiently with a HOE, or a non-coherent source.

The optional active control circuit/element(s) 225 may include an angle controller 230 and actuator 235. The actuator may be a Direct Current (DC) motor, stepper motor, piezoelectric actuator, or other electro-mechanical device capable and adaptable for use in moving the light source 205 at angles fine enough for use in the fingerprint sensor 100. A wavelength controller 240 may also be employed in the imager 110, where the wavelength controller 240 may be used to change the wavelength of the light source 205 in order to compensate for temperature-induced changes in the Bragg condition of the HOE. A power controller 245 may also be employed by the imager 110 to control the output power of the light source 205 for controlling exposure levels of the fingerprint 115.

The fingerprint camera 120 includes a sensor array 215 and electronics 220. The sensor array 215 may be a Charge Coupled Device (CCD) or a Complementary Metal Oxide Semiconductor (CMOS), for example, and have a number of pixels providing a resolution fine enough for use in the fingerprint sensor 100. The electronics 220 are coupled to the sensor array 215 for receiving pixel data for processing. The electronics may include a processor, memory, and sensor data communications interface.

It should be understood that the hierarchical diagram of FIG. 2 is merely exemplary and could be configured in other ways and include additional or fewer components for implementing the principles of the present invention.

Figure 3A:
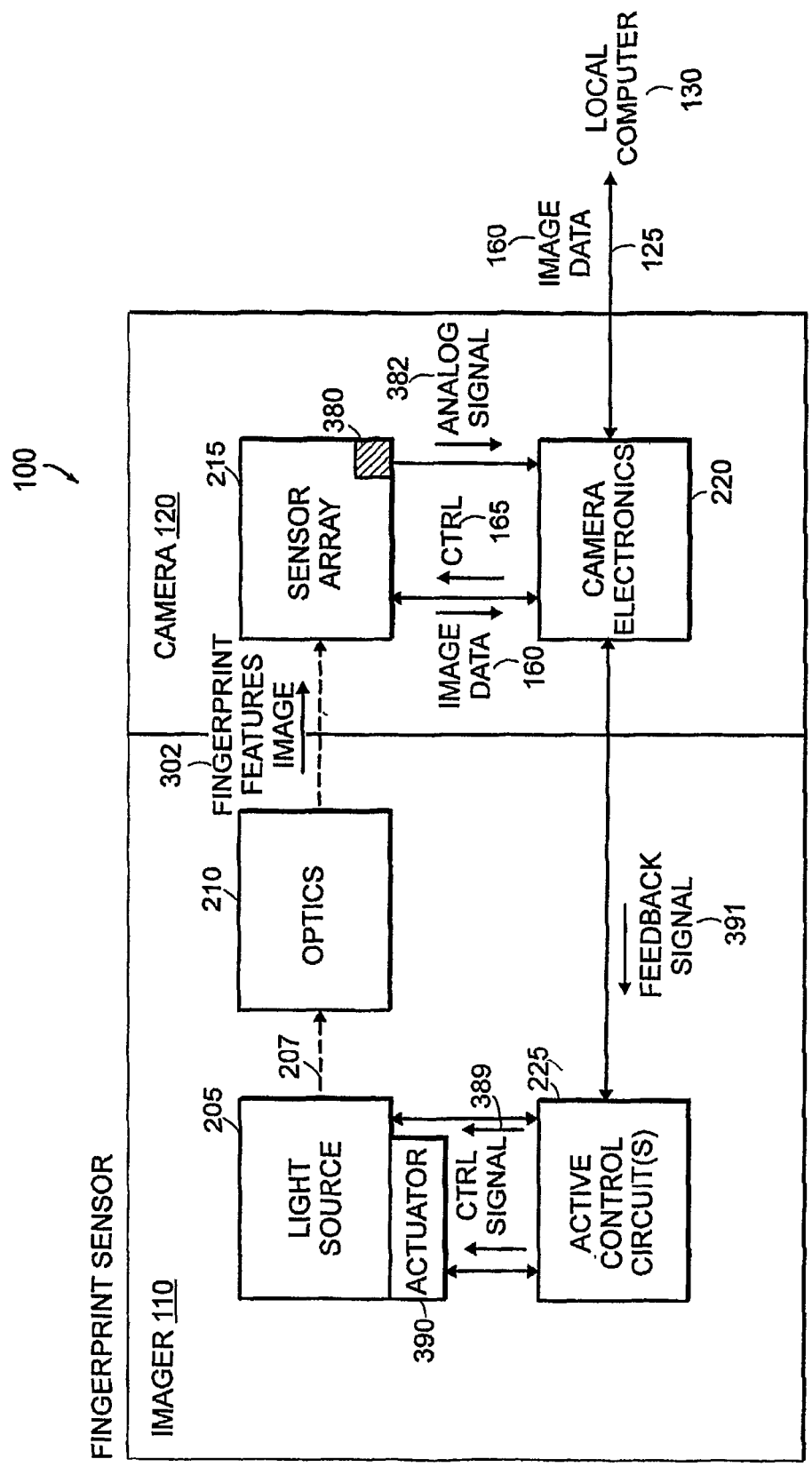
FIG. 3A is a high level schematic diagram of the fingerprint sensor of FIG. 1.

FIG. 3A is a generalized schematic diagram of the fingerprint sensor 100 and includes a subset of the components introduced in FIG. 2. The imager 110 of the fingerprint sensor 100 includes the light source 205 projecting a light beam 207 into the optics 210. An actuator 390 may be mechanically connected to the light source 205, to the optics 210 or to both, directly or indirectly, to direct the light beam 207 into the optics 210 in a controlled angular manner. Active control circuit(s) 225 provide(s) control signal(s) 389 to the actuator 390 and/or the light source 205 in accordance with the descriptions above in reference to FIG. 2. The active control circuit(s) may receive feedback from the actuator 390 or light source 205 for control or regulation purposes.

In this embodiment, a feedback signal 391 is presented to the active control circuit(s) 225 by the camera electronics 220. As in the case of typical feedback control systems, the feedback signal 391 is generated by the camera electronics 220 as a function of a difference between an actual signal level and a desired signal level corresponding to imaging performance. In the case of the fingerprint sensor 100, the feedback signal 391 may represent a deficiency in light intensity emitted by the light source 205, or may represent an angular error of the light beam 207 projecting onto the optics 210, where the angular error may be caused by temperature effects on the HOE. The camera electronics 220 may determine the feedback signal 391 based on the image data 160, subset thereof, or other signal provided by the sensor array 215. Other photosensitive areas 380 outside the active pixel field of the sensor array 215 may provide a signal 382, to the camera electronics 220, from which the feedback signal 391 is derived.

The camera electronics 220 may also provide a control signal 165 to the sensor array 215 for use during imaging of the fingerprint features image 302. Further, the camera electronics 220 also includes an interface (not shown) for communicating with the local computer 130 via the communications link 125 for transferring the image data 160.

Figure 3B:
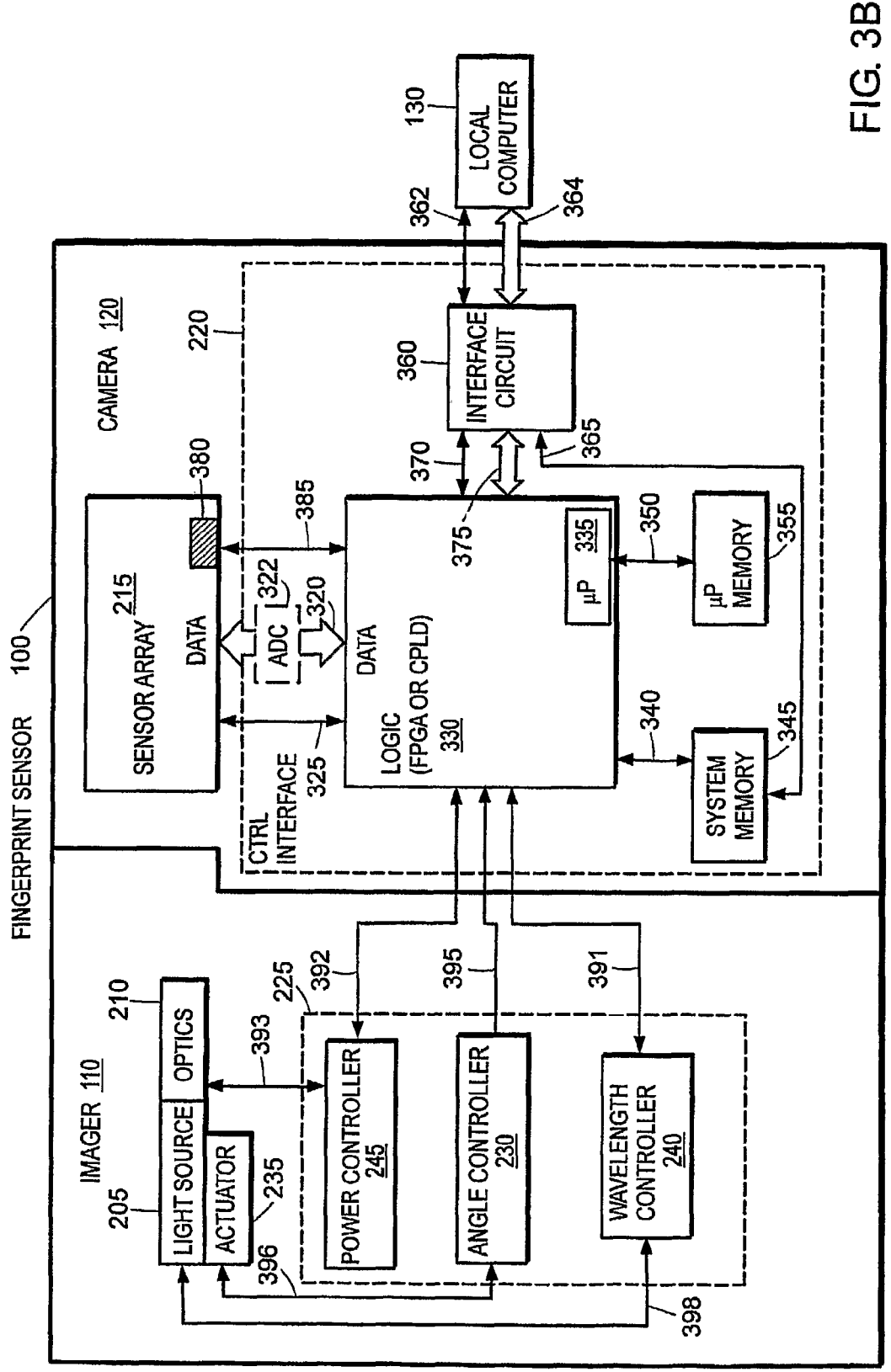
FIG. 3B is a detailed schematic diagram of the fingerprint sensor of FIG. 1.

FIG. 3B is a detailed schematic diagram of the fingerprint sensor 100. A brief description of the imager 110 and camera 120 is described in turn.

The imager 110 includes a power control circuit 245, angle control circuit 230, and wavelength control circuit 240. The power control circuit 245 provides feedback signals to the light source 205 via an interface 393. Similarly, the wavelength control circuit 240 provides feedback to the light source 205 via an interface circuit 398. The angle control circuit 230 provides a signal to the actuator 235 via an interface 396.

The optics 210 includes optical elements 250 and at least one HOE 410. The optical elements 250 and HOE 410 are arranged in a manner adapted for imaging the features of the fingerprint 115. Details of the arrangement between the optical elements 250 and HOE 410 are described in detail beginning in reference to FIG. 4.

Referring now to the details of the fingerprint camera 120, the electronics 220 include multiple electrical components, including: logic 330, microprocessor 335, microprocessor memory 355, system memory 345, interface circuit 360, and Analog-to-Digital Converter (ADC) 322, in embodiments where the sensor array 215 outputs data in the form of analog signals. The microprocessor 335 may be integrated into the logic 330 or may be a separate component communicating with the logic 330 over a bus (not shown). The logic 330 may be a Field Programmable Gate Array (FPGA) or other logic device or a processor adapted for performing the functions described herein with regard to the logic 330.

Communication between the sensor array 215 and the logic 330 occurs via a control interface 325, data bus 320, and, in certain cases, an alternate data line 385. Data is 'read out' of the sensor array 215 via the data bus 320 at a rate between 1 MHz and 60 MHz, in some applications, but may be increased or decreased based on the application and technological limits. In this embodiment, an additional photosensitive area 380 outside the active pixel field of the sensor array 215 may provide a feedback signal 382 via the line 385 to the logic 330 for use in providing the power feedback 392 to the power control circuit 245, the angle feedback 395 to the angle control circuit 230, or the wavelength feedback 397 to the wavelength control circuit 240, or any combination thereof. The logic 330 may be designed to receive signals from a subset of pixels in the sensor array 215 for use in computing an angle feedback signal 395, wavelength feedback signal 397, or power feedback signal 393, or any combination thereof. The logic 330 or microprocessor 335 may determine the feedback signals 391 (i.e., power feedback 392, angle feedback 395, or wavelength feedback 397) through use of various techniques, such as a Least-Means-Square (LMS) technique, optimization techniques, intensity differencing technique, or other process useful for determining single- or multi-variable control.

Continuing to refer to FIG. 3B, the microprocessor 335 communicates to the microprocessor memory 355 via a microprocessor memory bus 350. The logic 330 communicates with system memory 345 via a system memory bus 340. The system memory 345 may communicate with the interface circuit 360 via a memory/interface bus 365. The interface circuit 360 communicates with the logic 330 via a logic/interface control bus 370 and logic/interface data bus 375. The interface circuit 360 communicates with the local computer 130 via a local bus 125, which includes control lines 362 and data lines 364.

In operation, the light source 205 produces an expanded, collimated optical beam 207 that is projected by the optical element 450 and HOE 410 to reflect off a cover plate 420 for imaging the features of the fingerprint 115 by the sensor array 215. The sensor array 215 outputs data representing an image of at least a portion of the fingerprint 115 to the logic 330 via the data bus 320 at a sampling rate of, for example, 40 MHz. The logic 330 directs the image data 160 to different places in various embodiments. For example, in one embodiment, the logic 330 directs the image data 160 to the system memory 345 for additional processing or directs the image data 160 to the interface circuit 360 via the logic/interface data bus 375 for direct transmission to the local computer 130. The logic 330 may also direct a portion of the image data 160 to the microprocessor 335 for determining the feedback signals 391 in an embodiment in which active feedback control is employed in the fingerprint sensor 100.

Figure 4:
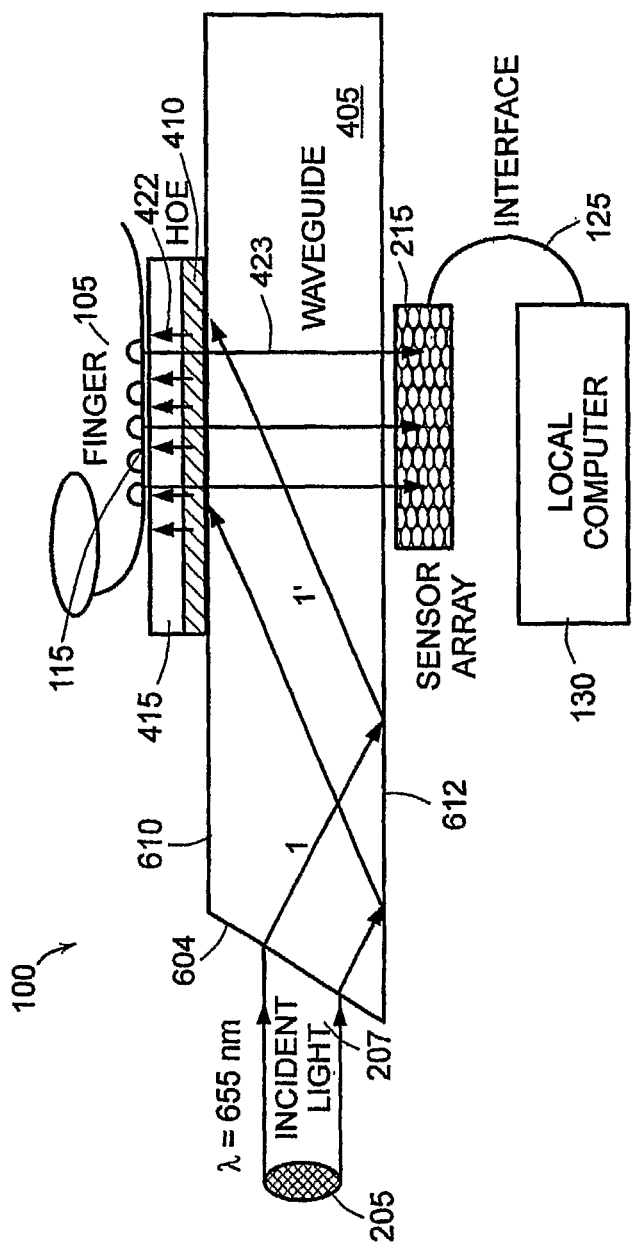
FIG. 4 is a generalized mechanical diagram of an imager in the fingerprint sensor of FIG. 1.

FIG. 4 is a schematic diagram of the imager 110. Referring first to the imager 110, the light source 205 produces coherent, expanded beam of light 207 at a wavelength of, for example, 655 nm. The light beam 207 enters the optical element 405 at an angle that causes the light 207 to be guided through the waveguide 405 by total internal reflection at the substrate-air interfaces. The light beam 207 encounters an interface between a Holographic Optical Element (HOE) 410 and the substrate waveguide 405, at which point, a portion of the light beam 207 is diffracted by the HOE, which includes a holographic grating, at a near normal angle to the guide surface and travels through a cover plate 415 to the finger 105. Fresnel reflection of the diffracted light at the interface of the cover plate 415 and fingerprint 115, referred to herein as a "finger contact surface", directs some of the diffracted light back through the HOE 410, through the substrate waveguide 405, and onto the entrance face (i.e., sensor array 215) of the camera 120. Reflection at the cover plate is suppressed at locations where objects come into optical contact with the cover plate. The remaining reflected light carries an image of these contact areas to the camera 120. The image data 160, which represents an image of the fingerprint 115, is directed across the data bus 125 to the local computer 130 in a manner as discussed above in reference to FIG. 1.

One example embodiment of the fingerprint imager 110 is constructed as follows. The light source 205 is a laser diode that emits 5 mW of light at 652 nm. The substrate (e.g., glass) waveguide 405 has an entrance face for the laser light 207 that is beveled to an angle of about 60 degrees from the horizontal. The dimensions of the waveguide 405 are 36 mm long, 2.5 mm thick, and 25 mm wide. The cover plate is 1 mm thick and having a square surface of 25×25 mm. In this example, the image of the fingerprint 115 is captured by a CMOS electronic imager having a 1024 by 1280 array of 6 μm square pixels and 256 gray levels. The size of the resulting image is 6.1 mm by 7.7 mm, while its resolution is 167 pixel per mm or 4200 pixels per inch.

In operation, when the finger 105 is pressed onto the finger contact surface 420, the ridges of the fingerprint 115 make optical contact and suppress reflection. Since pores are depressions along the ridges, there is reflection from the cover plate at pore locations. The resulting image of the fingerprint 115 that is presented to the camera 120 includes light colored areas for the valleys and dark ridges with light pores aligned along the ridges. An undistorted, high-resolution image of the fingerprint 115 can be captured by the camera if the light beam 207 that is diffracted by the HOE 410 is collimated and has a uniform wavefront.

Figure 5:
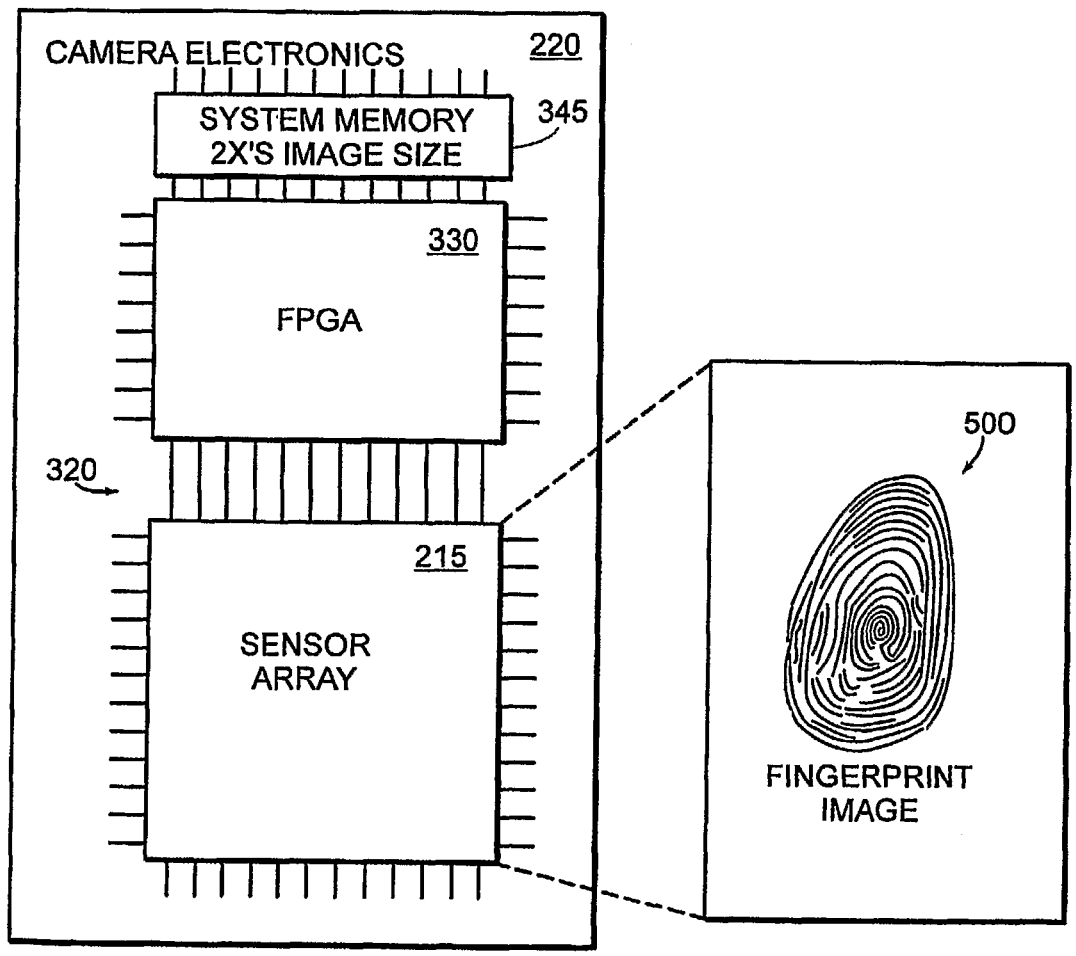
FIG. 5 is an electrical schematic diagram of camera electronics in a camera of the fingerprint sensor of FIG. 1.

FIG. 5 is a schematic diagram of a subset of the camera electronics 220. This schematic diagram provides a layout of the sensor array 215 and the FPGA 330. The size of these components 215, 330 results in a particular layout in which the finger 105 is positioned on top of the imager 110 in a manner such that the fingerprint image 500 acquired by the sensor array 215 may be mis-oriented in a way that inverts the left-right orientation of the image, for example, or rotates the image to a position clockwise from the desired viewing position, for example. The image is preferably, and in some cases must be, acquired and displayed in the same orientation as observed when inked and rolled on a white card, to preserve the traditional orientation used to store and compare pre-existing law enforcement image databases. Therefore, the FPGA 330 may be programmed to change the image orientation through predefined data manipulation. For example, the system memory 345 may be designed to store two or more times the amount of image data 160 so as to allow the FPGA 330 to rewrite the image data within the memory in a manner for reading-out the data to the local computer 130, which allows the fingerprint image 500 to be displayed to a viewer in a standard "tip up" orientation. In the case of a large system memory, the size of the system memory 345 also allows for storage of multiple data size fingerprint images 500 for buffering or averaging purposes. It should be understood that the system memory 345 may be larger or smaller than just described depending on the particular application.

Figure 6A:
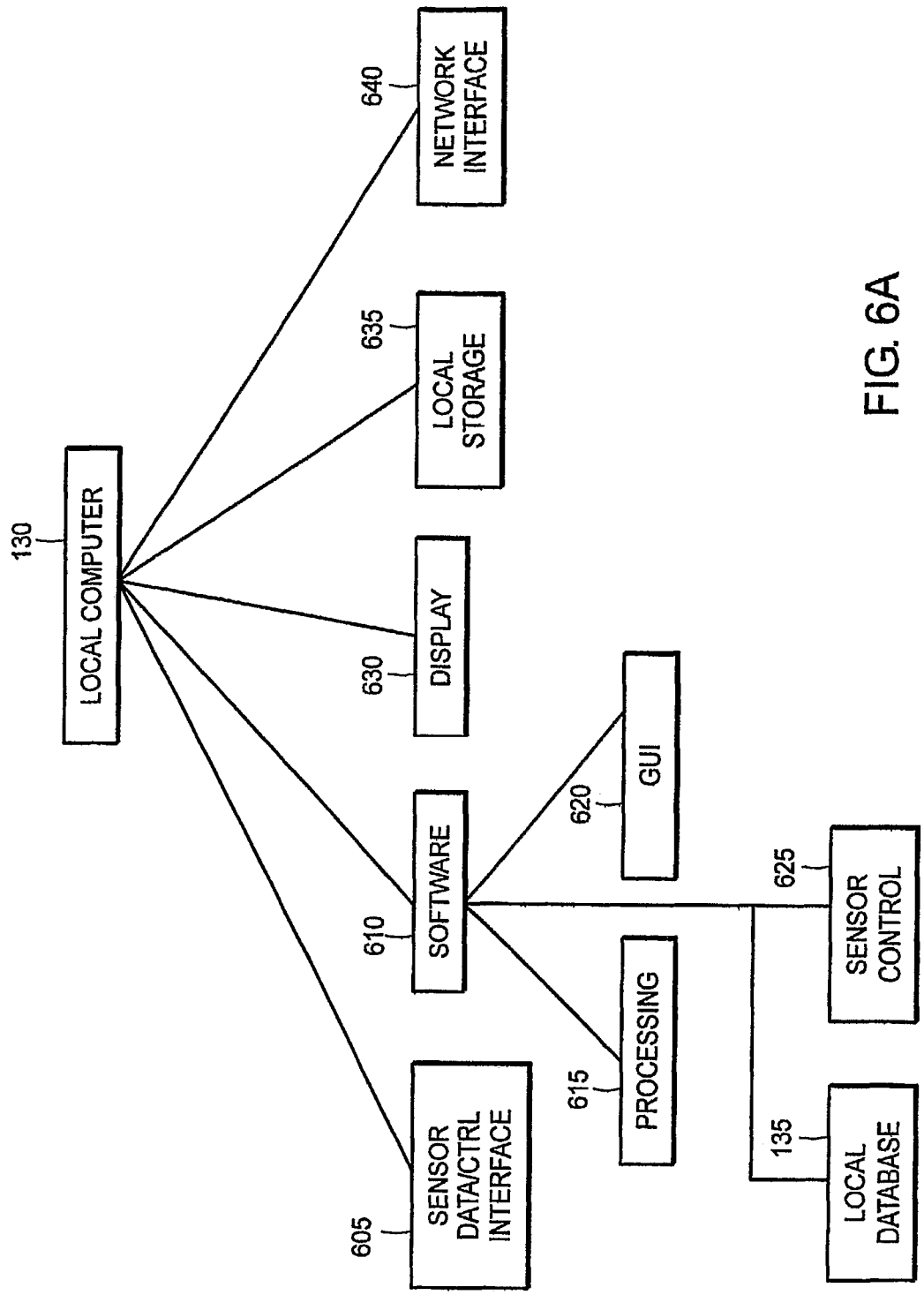
FIG. 6A is a hierarchical diagram of a local computer used in the computer network of FIG. 1.

FIG. 6A is a hierarchical diagram of the local computer 130. The local computer 130 includes a sensor data/control interface 605, software 610, display 630, local storage 635, and network interface 640. The software 610 includes processing software 615, a Graphical User Interface (GUI) 620, the local database 135, and sensor control software 625. The local computer 130 can be a standard computer that is customized to operate with the fingerprint sensor 100 or can be a custom-designed computer that includes specific, optimized hardware, such as a specific sensor/data control interface 605 to optimize performance with the fingerprint sensor 100.

Figure 6B:
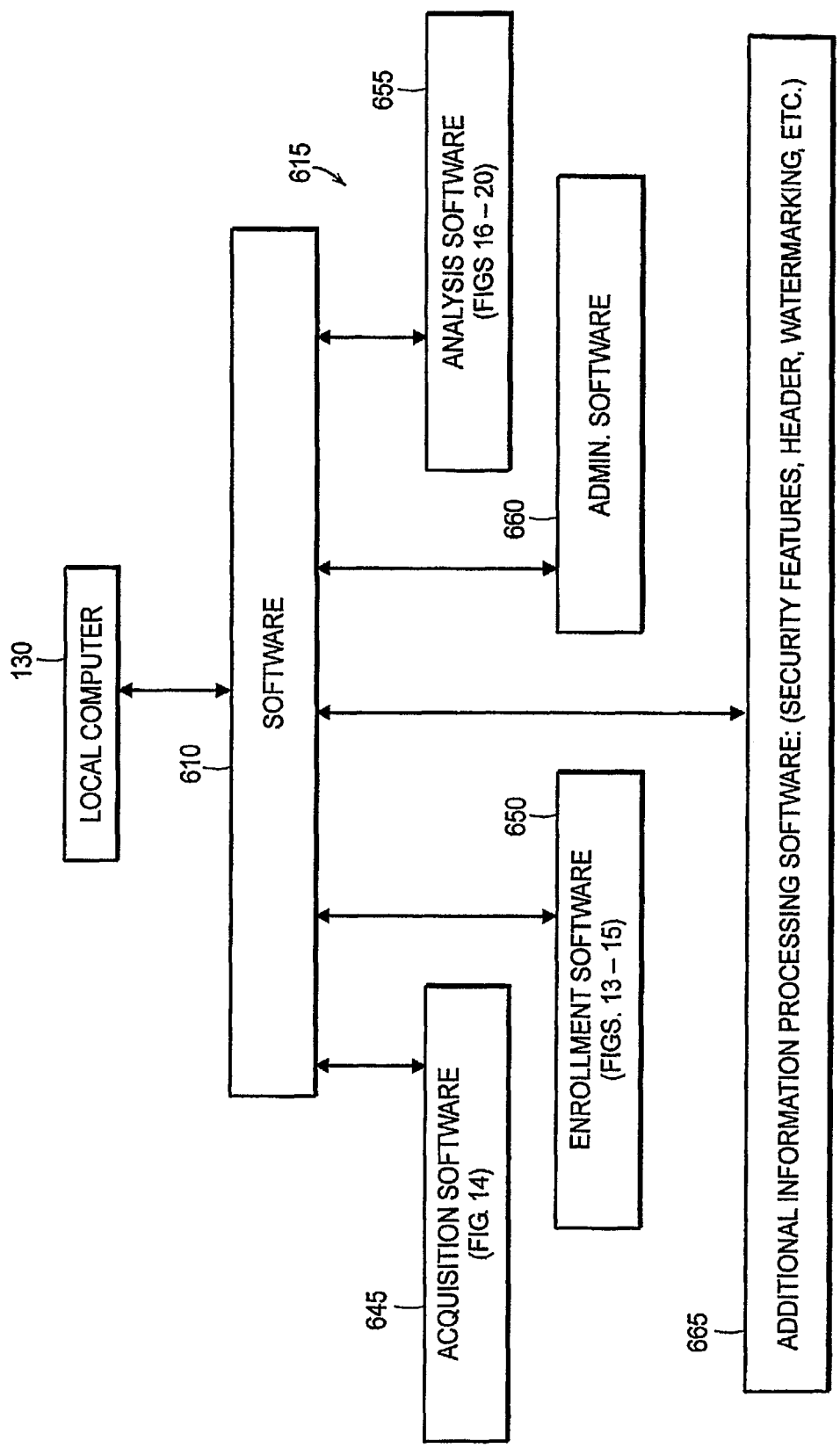
FIG. 6B is a block diagram of example software executed in the local computer of FIG. 1.

FIG. 6B is a block diagram of example processing software 615 that may be loaded and executed by the local computer 130. The processing software 615 may include acquisition software 645 (FIG. 14), enrollment software 650 (FIGS. 13-15), analysis software 655 (FIGS. 16-20), administrative software 660 (e.g., database administration), and additional information processing software 665 (e.g., security features, header information, and watermarking). Details of the processing software 615 are described in detail below in reference to the indicated associated figures.

Figure 7:
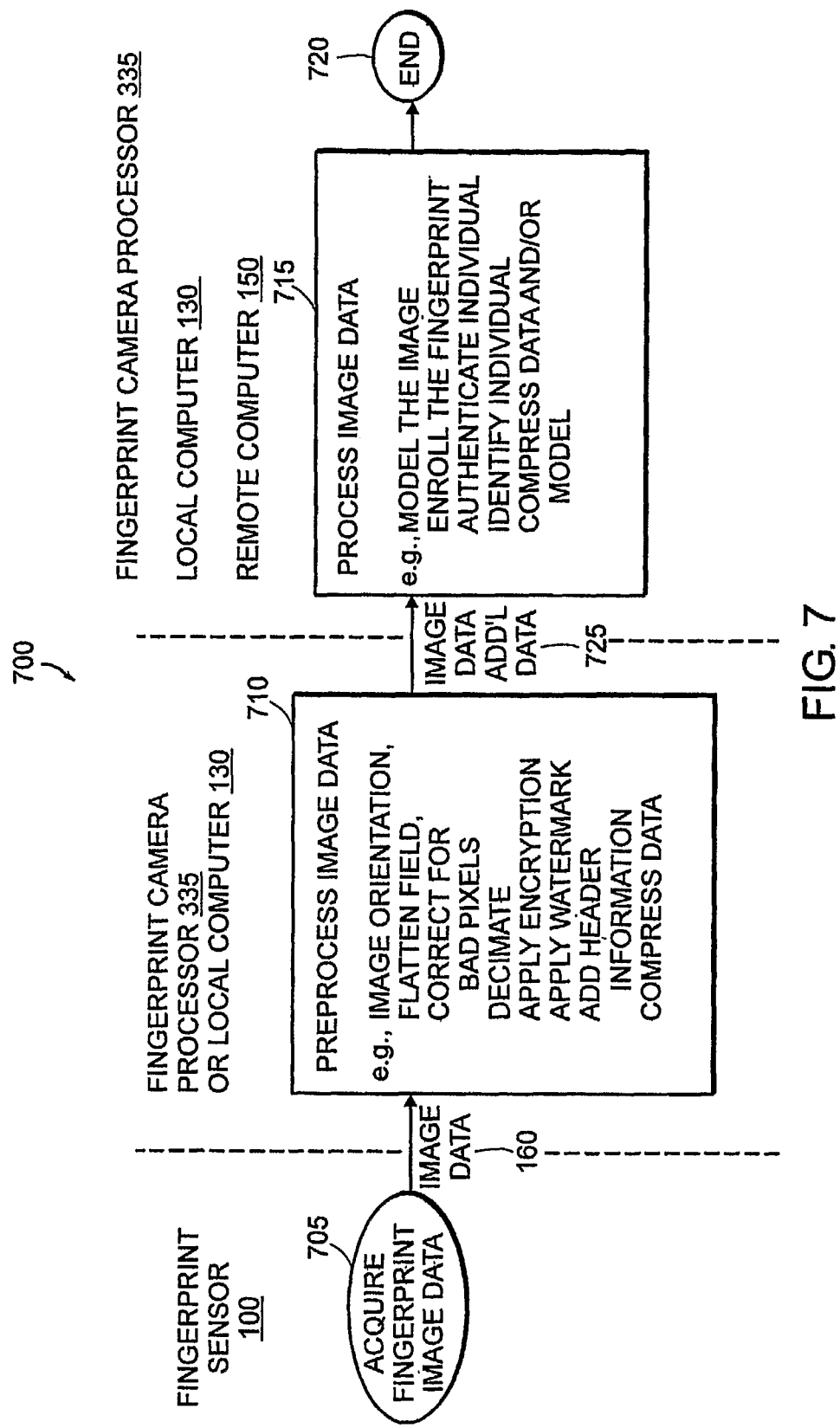
FIG. 7 is a flow diagram of a process associated with acquiring and processing of the fingerprint image data acquired by the fingerprint sensor of FIG. 1.

FIG. 7 is a system level flow diagram of a process 700 for (i) imaging the fingerprint 115 with the fingerprint sensor 100 through (ii) processing image data 160 representing an image of at least a portion of the fingerprint. The process 700 begins with the fingerprint sensor 100 capturing fingerprint image data (step 705). The image data 160 is presented to the fingerprint camera processor 335 or local computer 130 for preprocessing (step 710). Preprocessing can help speed system performance significantly, while maintaining more cost effective imager to computer interfaces that might otherwise be bandwidth limited. Preprocessing 710 may include changing the image orientation, calibrating the image, scaling the image, flattening the field across the pixels of the sensor array 215, correcting for defective pixels of the sensor array 215, decimating the captured image data 160, applying encryption to the image data, applying a watermark to the image data, adding header information to the image data, or compressing the data, optionally through a lossless compression technique. Other forms of preprocessing may also be applied for transmission and/or storage with the image data 160. The image data and, optionally, the additional data (collectively 725) is provided to the fingerprint camera processor 335, local computer 130, or remote computer 150 for processing the image data 160 (step 715). Examples of processing the image data 160 include: modeling the features of the fingerprint, enrolling the fingerprint, authenticating the individual associated with the data representing at least a portion of the fingerprint, and identifying the individual. The process 700 ends in step 720.

Figure 8:
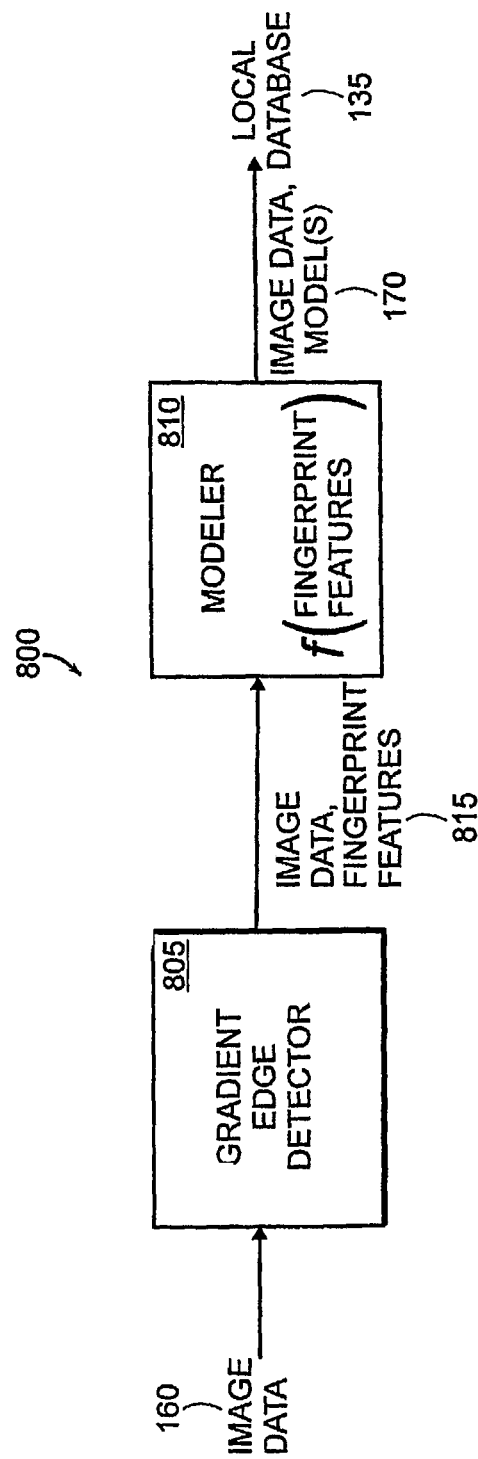
FIG. 8 is a high level block diagram of example processing elements operating in the computer network of FIG. 1 for processing the acquired fingerprint images.

FIG. 8 is a flow diagram of a process 800 for modeling the image as a function of the fingerprint features. The image data 160 is processed by a gradient edge detector 805. The gradient edge detector provides the image data and fingerprint features (collectively 815) to a modeler 810. The modeler generates a model of the fingerprint as a function of the fingerprint features. The modeler 810 outputs image data and model(s) (collectively 170) to a local database 135 or other processor, such as the remote computer 150 for additional processing or storage in the remote database 155, for example.

FIGS. 9-12 include images of fingerprints 115 that are (i) displayed to a user, (ii) modeled, (iii) processed (e.g., authenticated, identified, etc.), or (iv) stored for later retrieval. FIGS. 13-20 include example processes that improve the analysis of both high-resolution fingerprints that contain resolved pores and lower resolution fingerprints without resolved pores. The processes of FIGS. 13-20 do so by using identifying information in a fingerprint, which can include ridge shapes or profiles in addition to the traditional ridge contours, and the position, shape and prominence of pores. Before describing the processing, a brief description of the fingerprint images and overlays indicating fingerprint features determined by the processing is described.

Figure 9:
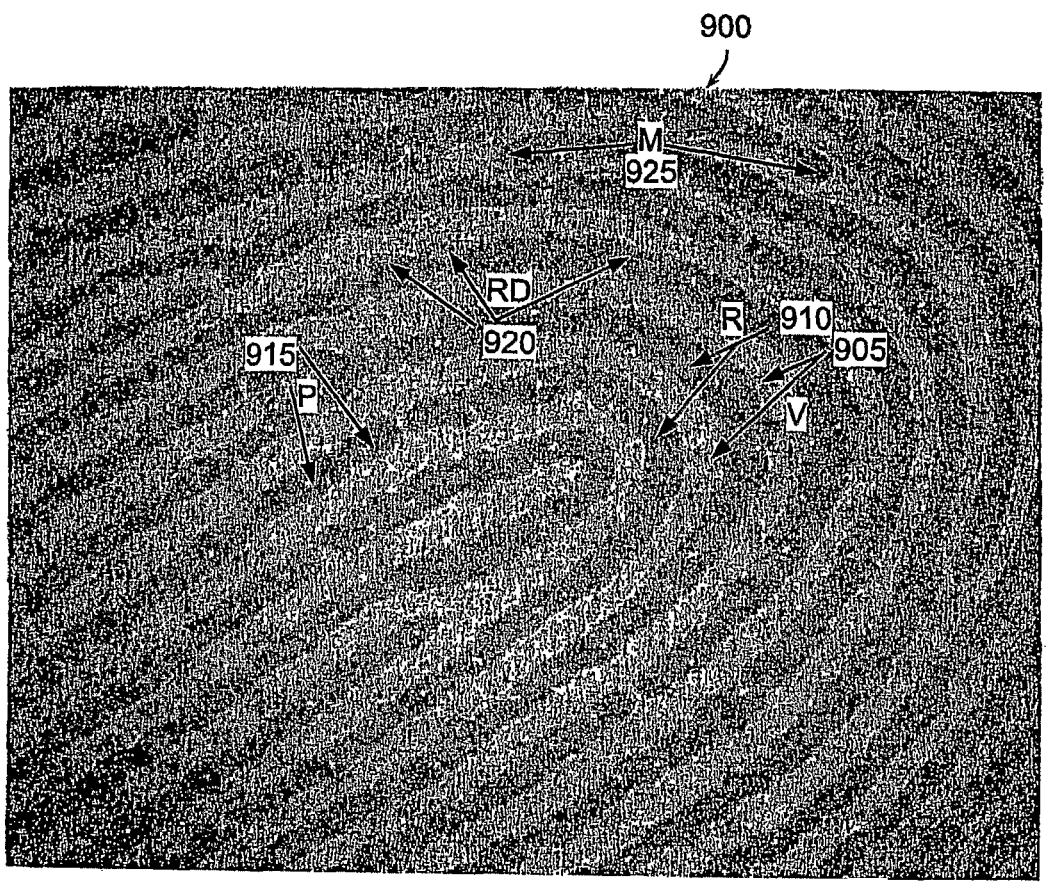
FIG. 9 is an image of a portion of a fingerprint acquired by the fingerprint sensor of FIG. 1.

FIG. 9 is an example of a fingerprint image 900, represented by the image data 160, that was acquired with the fingerprint sensor 100. Light colored (e.g., gray) valleys (V) 905 and dark ridges (R) 910 are observable. Examples of pores (P) 915, ridges 910, ridge details (RD) 920, and minutiae (M) 925 are all indicated in the figure. Some or all of these types of features can be used by the processes of FIGS. 13-20 to compare and match fingerprint images 900. The fingerprint image 900 contains fewer than ten minutiae 925 and almost ten times as many pores 915 as minutiae 925.

Figure 10:
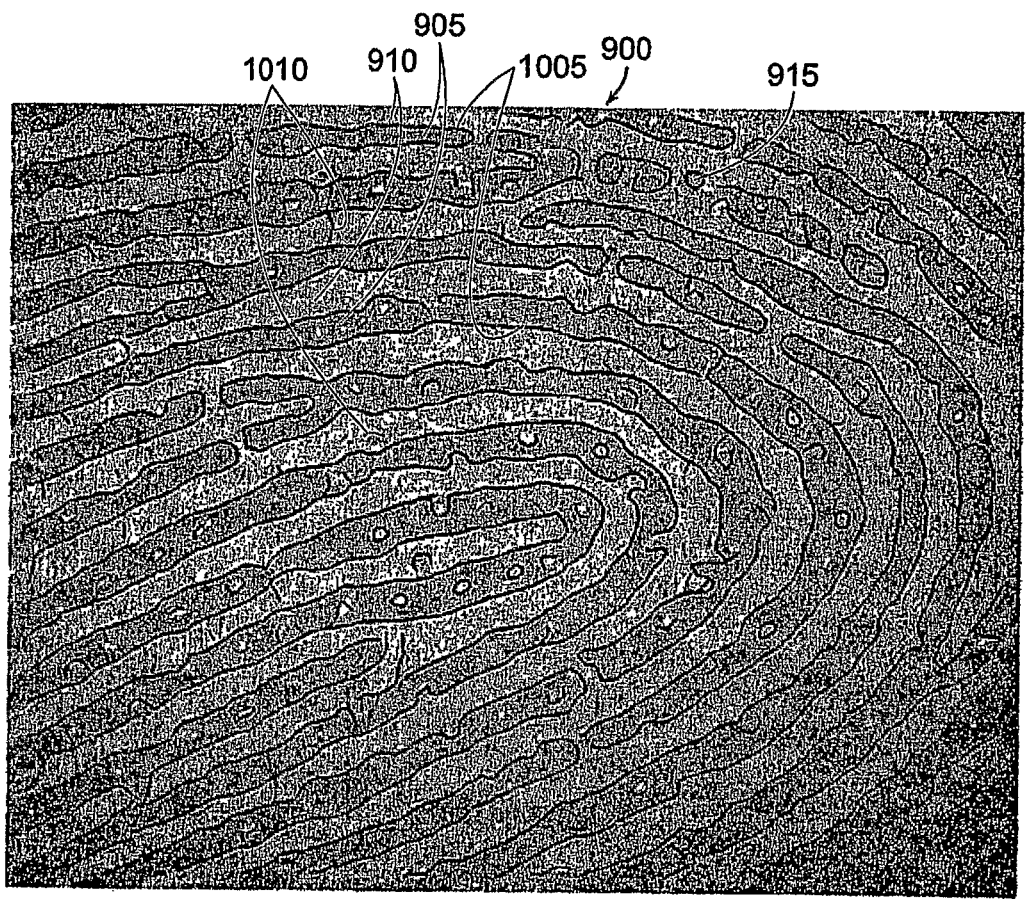
FIG. 10 is the image of FIG. 9 with an overlay of outline features of fingerprint ridges.

FIG. 10 is an example of the image data 160 including indications of features obtained at the "outline" resolution level. Thick lines 1005 trace identified boundaries between ridges 905 and valleys 910 and outline some of the pores 915. Features that are outlined in thick lines 1005 are considered real and are used for subsequent fingerprint matching steps. Noise is traced in thin lines 1010 and is not used for matching. A trained model of a single fingerprint includes one or more of these feature sets from various regions of the complete fingerprint image data 160.

Figure 11:
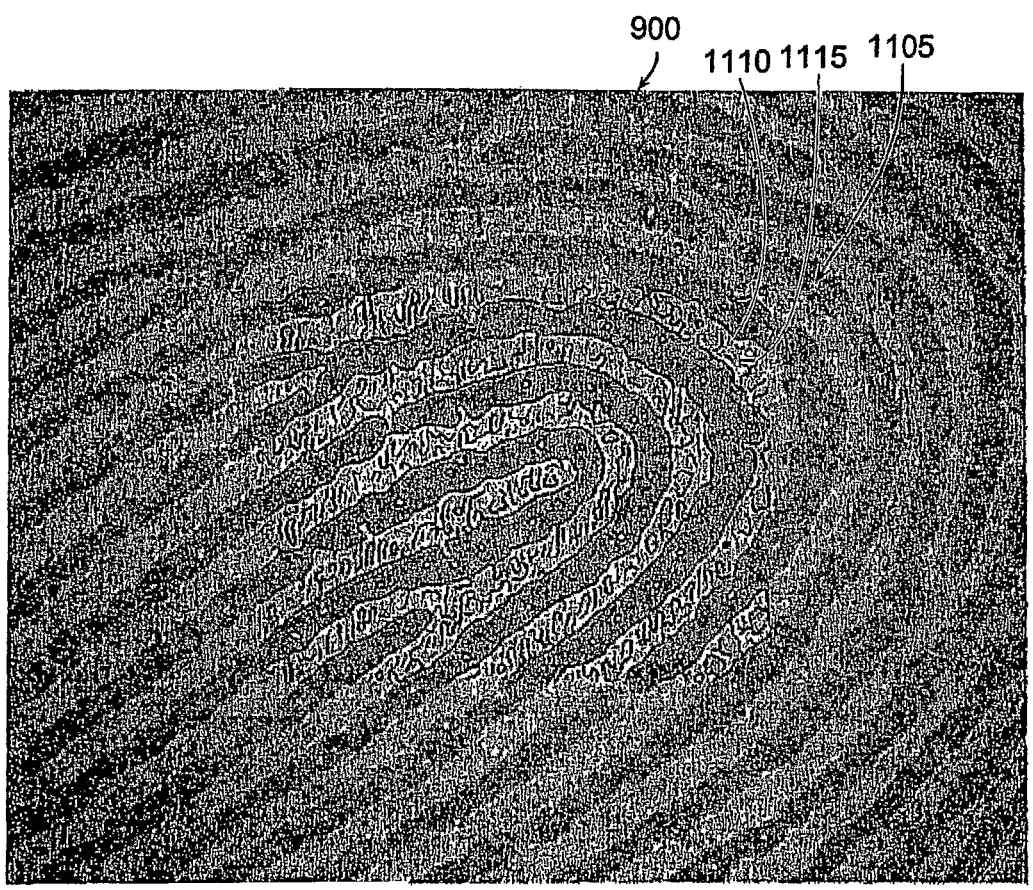
FIG. 11 is the image of FIG. 9 with a subset of the fingerprint overlaid with detail features of the fingerprint ridges and deviations.

FIG. 11 is an example of the fingerprint image data 160 with a smaller central region 1105 containing highlighted features that were identified using gradient edge detection procedures, discussed below beginning at FIG. 13. The features were obtained at the "details" level of resolution. Similar to FIG. 10, thick lines 1110 indicate "real" (i.e., non-noise) features and thin lines 115 indicate noise.

The local computer 130 may display the image data 160 in the form of the fingerprint image 900 in the GUI 620. Through use of standard or custom GUI techniques, the user can, for example, (i) select specific features that must be present for a match, (ii) move the modeled region 1105 in any direction to model different area, (iii) enlarge or reduce the size of the modeled region, or (iv) select or deselect features within the region to reduce noise from being part of the model, or to include specific features within the region.

Figure 12:
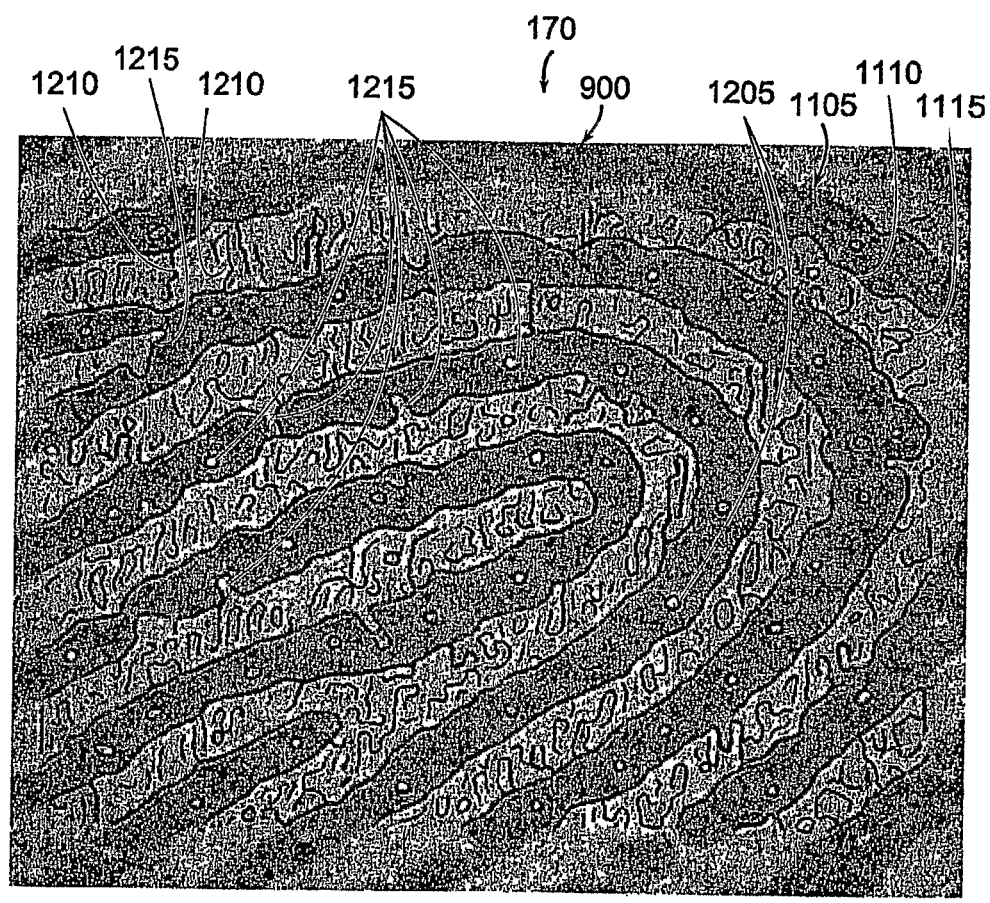
FIG. 12 is a zoomed-in image of the portion of overlaid features of FIG. 11.

FIG. 12 is an expanded view of the model region 1105 from the fingerprint shown in FIG. 11 that includes indications of features or noise operated on by the user via the GUI 620. In the fingerprint image 900, the thick gray lines 1110 are real, and the black lines 115 are noise. However, the user may want to change the results produced by the automated processing. For example, the user may use a Graphical User Interface (GUI) to deselect certain features 1205 he or she may consider noise even though the automated processing considered the features 1205 real fingerprint features. The manual selection process may also work in reverse, where features the automated processing considers noise may be reselected by the user to be included as real fingerprint features 1210 through use of the GUI 620.

There are thousands of features included in the enrolled model information set. A later comparison to these features that finds, for example, 80% of the total enrolled features means that 4000 separate features were found that match an original enrolled image of 5000 total features in an area as small as 5×5 mm, for example.

In addition, the user may define specific features 1215, or a percentage of specific features as being required, in addition to a percentage of all features, as qualification criteria for a match. The more features 1215 that are required for a match reduces the likelihood of false detections but increases the likelihood of missed detections. Therefore, a threshold number of required features 1215, such as 80%, may be specified to account for noise, distortions, lighting or other imaging-related effects.

Multiple biometrics (e.g., multiple fingerprints of an individual; fingerprint(s) and palm prints; fingerprint(s) and iris scan; and so forth) may be acquired and modeled. The multiple biometrics may be combined in various manners, such as root-mean-square or weighted sum, to for a "combined metric." The combined metric may be used for later comparing of the acquired multiple biometrics with future acquired images (e.g., live scans). Combining multiple biometrics may improve system reliability.

The image data and model 170, collectively, may be transmitted as a paired set from the local computer 130 to the local database 135 or remote computer 150 as discussed above in reference to FIG. 1. In applications where the smallest possible model is required, on a smart-card or drivers license, for example, only the model, without the accompanying image may be used. The outline features, details features, required features 1215, and fine details (e.g., pores) features may be stored as part of the model and used during later processing.

Referring now to processing aspects of the present invention, two major steps are described: fingerprint enrollment (FIGS. 13-15) and fingerprint matching (FIGS. 16-19). During enrollment, a high-resolution digital fingerprint (e.g., image data 160 representing the fingerprint image 900) is acquired, and one or more sets of features to be used for subsequent fingerprint matching are identified. Fingerprint matching compares these sets of features (e.g., ridge deviation details, such as the required features 1215, pores, and minutiae) to the unknown fingerprints and decides if the two fingerprints are from the same individual. The source for these two fingerprints can be a database of high-resolution fingerprints, a live scan image, a legacy database of lower resolution fingerprints, latent fingerprints (i.e., fingerprints "lifted" at a crime scene), or combinations of these sources. Although the invention makes use of the extensive data available with higher resolution images, the techniques also work with lower resolution images.

The processes of FIGS. 13-20 describe an automatic fingerprint recognition method that identifies fingerprint features by using gradient edge detection techniques. In one embodiment, the features are acquired in gray-scale. In another embodiment, color may be part of the acquired image. The techniques identify and trace edges of structural features to outline ridges and pores. At sufficiently high resolution, the ridge outlines contain thousands of unique structural features (i.e., level three features) that can be used in fingerprint matching. This capability improves matching reliability over systems that reduce ridge patterns (by binarization and thinning) to a few minutiae types Because of the richness of features in fingerprints at high resolution, the method and apparatus according to the principles of the present invention produces reliable, high speed matching of small prints to a much higher degree of accuracy than with standard minutiae-only based systems.

The processes of FIGS. 13-20 analyze an unaltered gray-scale image of the fingerprint 115 to reduce both computing time and false accept rates. In a preferred embodiment, edge detection software is combined with high resolution image acquisition technology that is capable of resolving pores and ridge profiles.

Figure 13:
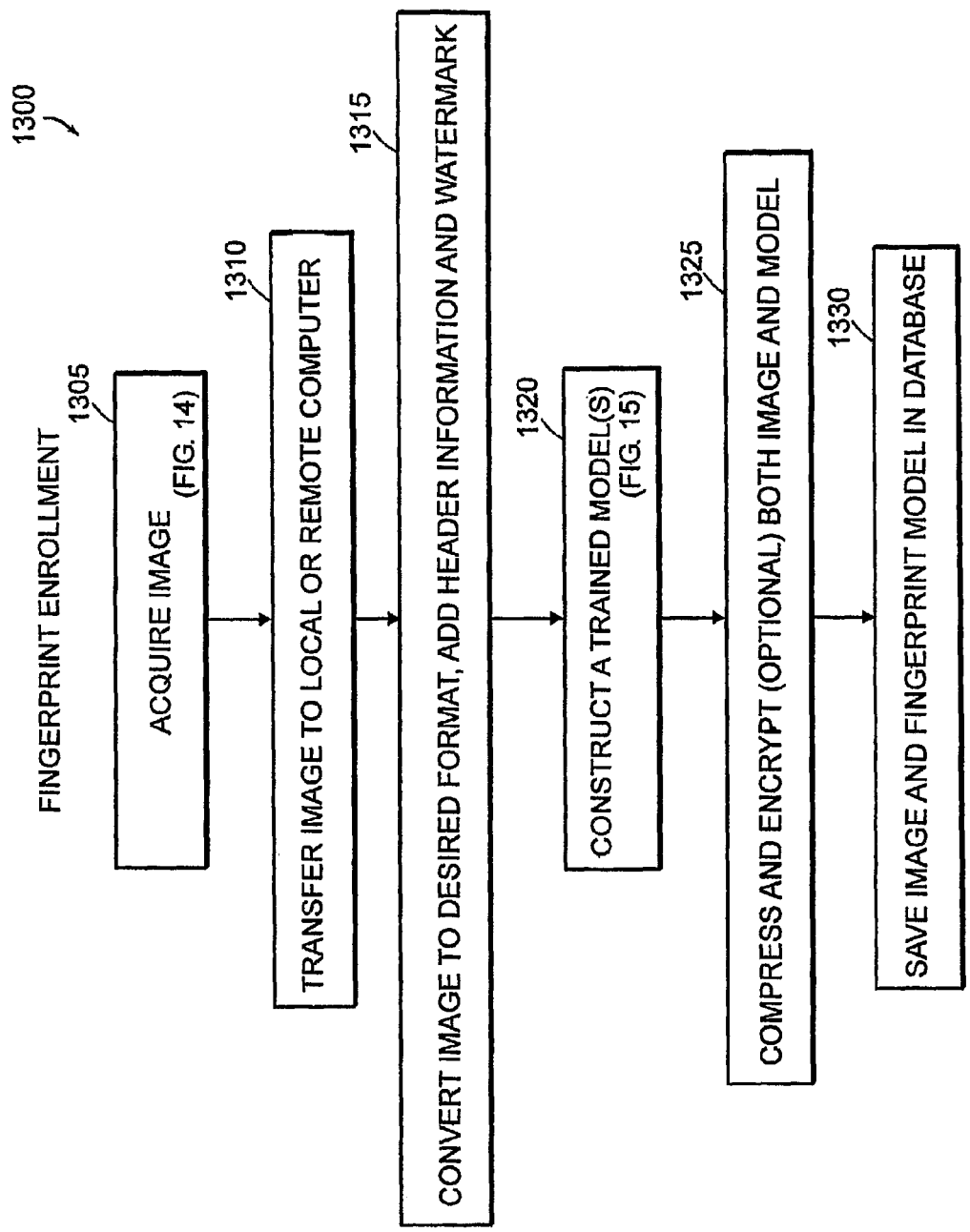
FIG. 13 is a flow diagram of a fingerprint enrollment process executed by the enrollment software of FIG. 6B.

FIG. 13 is a flow diagram of an example process 1300 for enrolling a fingerprint 115. The fingerprint 115 is first acquired (step 1305). An example process for acquiring an image is provided in FIG. 14.

Figure 14:
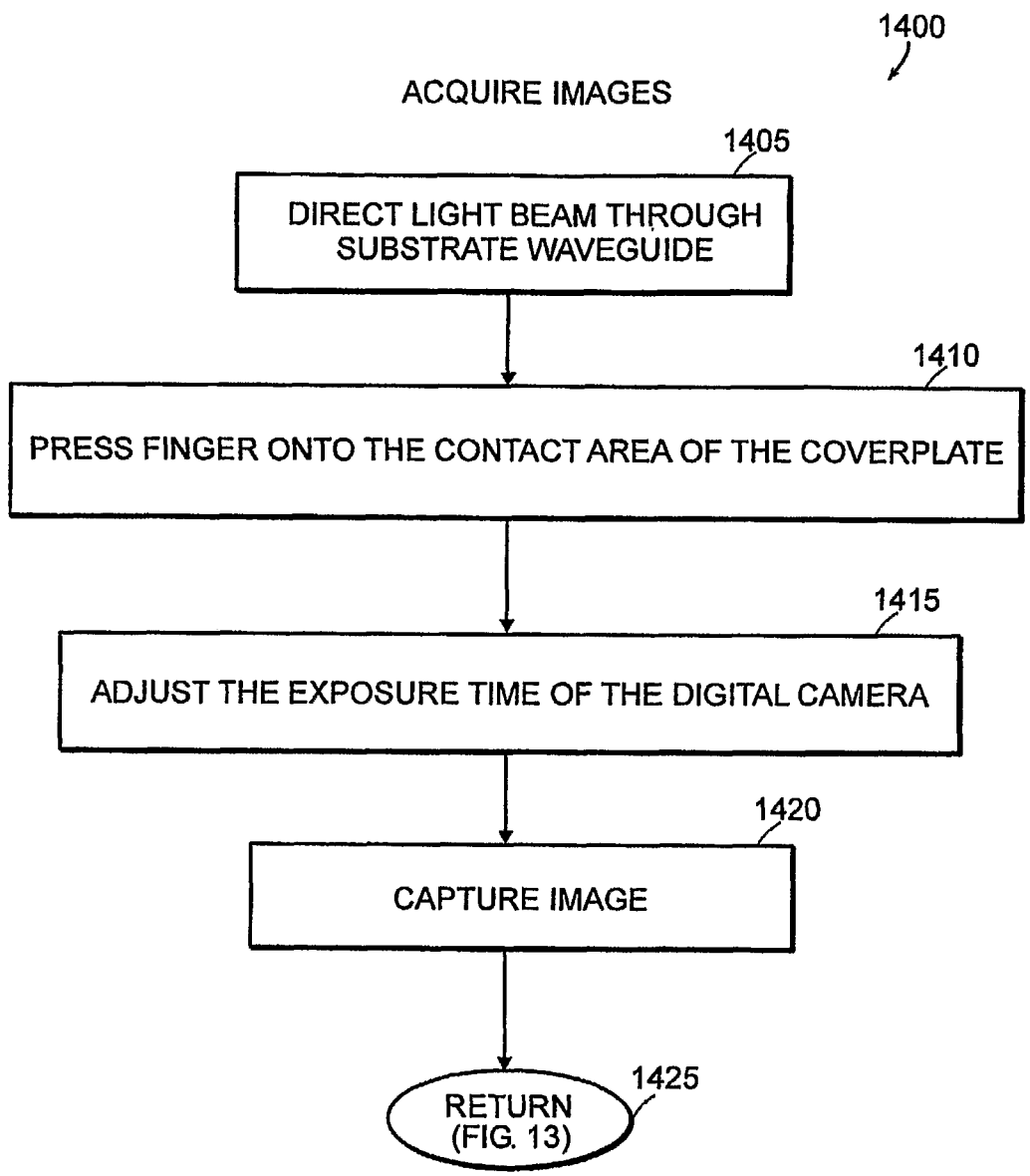
FIG. 14 is a flow diagram of acquisition software of FIGS. 6B and 13.

FIG. 14 illustrates a flow diagram of an example process 1400 for acquiring an image of the fingerprint 115, described in reference to FIG. 4. A direct light beam 207 is transmitted through a substrate waveguide 405 (step 1405). The finger 105 is pressed onto a contact area of a coverplate (step 1410). The exposure time of the fingerprint camera 120 is adjusted (step 1415) either manually or automatically. The fingerprint image 302 (FIG. 3A) is captured (step 1420), and the process 1400 returns (step 1425) to the process 1300 of FIG. 13 for further processing.

Referring again to FIG. 13, after acquisition, the image data 160 is transferred (step 1310) to the local or remote networked computers 130, 150, respectively, by one of a number of possible connecting protocols, such as, but not limited to, IEEE 1394 (Firewire), USB, Serial ATA, fiber-optic cable, any applicable wireless communications protocols, such as BlueTooth or 802.11g, or Ethernet. The image data 160 is then converted (step 1315) to a desired file format, and header information, and optionally a watermark, may be added to the image data 160. The header may contain information regarding the fingerprint 115 and how, when, and where it was acquired, the manufacturer, model and serial number of the acquisition device, the unique ID and name of the computer as well as the name of the operator logged on to the operating system, and pointers to related information, such as personal information about the individual, including, but not limited to, a photograph, voice recording (sometimes referred to as a "voice print"), signature, or other identifying information. A watermark can be added to protect the image and data header from subsequent unauthorized alteration. One example of a procedure to add a watermark to fingerprint images is described by Yeung and Pankanti, "Verification watermarks on fingerprint recognition and retrieval" Journal of Electronic Imaging, 9(4), 468-476 (2000). Commercial watermarking procedures can also be used.

Continuing to refer to FIG. 13, after the fingerprint is acquired (step 1305), specific and unique features of the fingerprint are identified, extracted and stored as a "trained model" (step 1320), according to a process described below in reference to FIG. 15. The model may be used for subsequent fingerprint verification (one-to-one matching) by comparing the feature sets of the model to the corresponding features of a subject, or "present," image. Features from the entire image are usually extracted and stored for fingerprints that are to be used for fingerprint identification (one-to-many matching). An example process of constructing a model is described in reference to FIG. 15.

Figure 15:
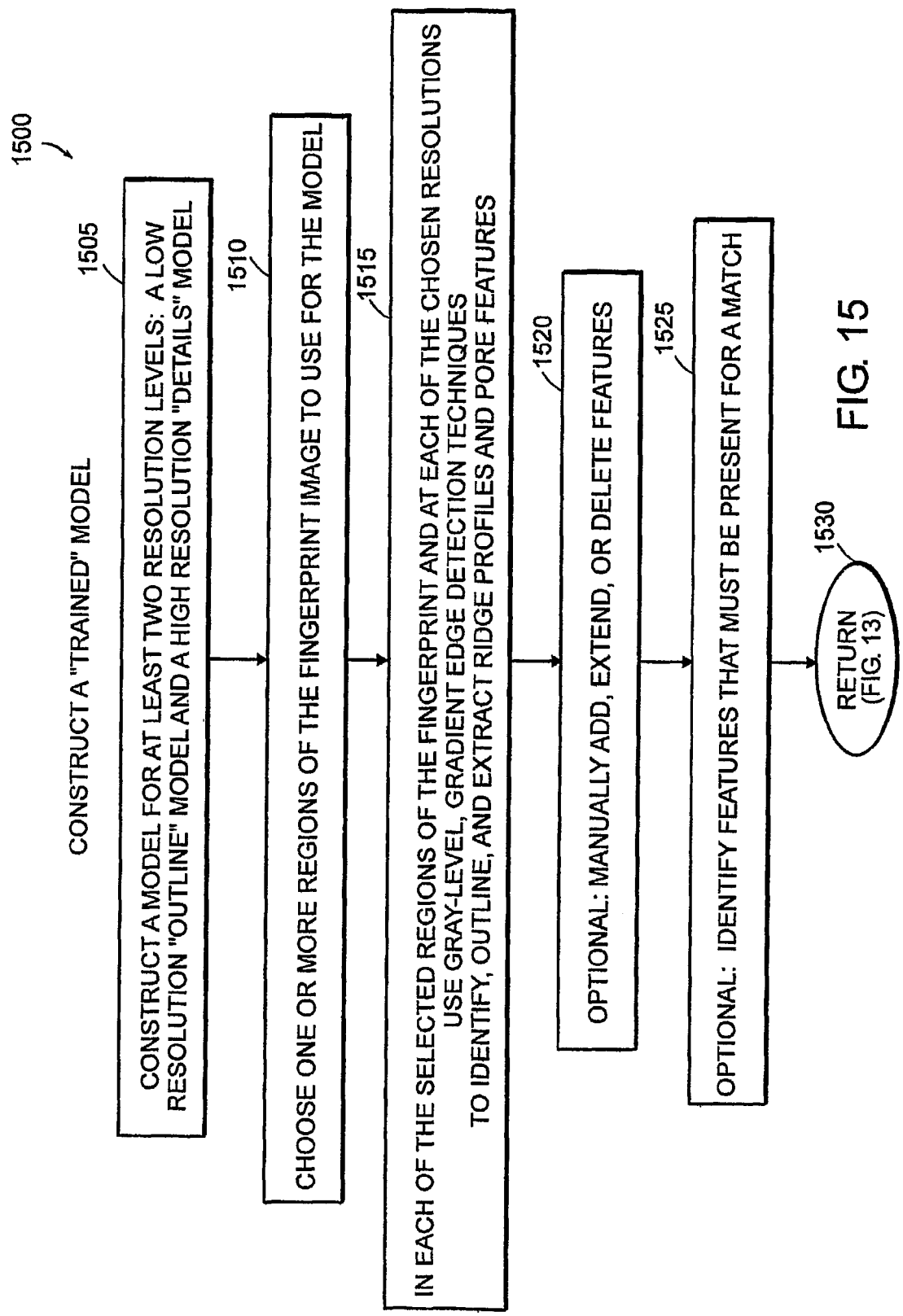
FIG. 15 is a flow diagram of a process for constructing a model of the fingerprint acquired by the processes of FIGS. 13 and 14.

FIG. 15 is a flow diagram of an example process 1500 for creating a model of a fingerprint that can be used for subsequent analysis and matching. At least two models are constructed (step 1505) from high resolution images: a low resolution "outline" model that comprises ridge contours, and a high resolution "details" model that comprises ridge contours, ridge shapes, and pores. Details regarding ridge shapes and pores are generally not considered in the outline model; compare FIG. 10 for an example of the features that are typically identified at the outline level to FIGS. 11 and 12 for features found at the details level. A further refinement adds a third, more highly detailed model specifically designed to more closely identify pore feature information, such as area, and centroid location. Edge detection levels may be changed for each of the three models in order to identify specific details, such as pores within ridges, with higher accuracy.

Since the outline model contains less information, computation time is reduced by first comparing images at the outline level for a candidate match before attempting to match candidate images at the details level. Both outline and details models may be constructed using the same procedure of gradient edge detection (e.g., gray-scale gradient edge detection) (step 1515). In one embodiment, the outline model is determined from a subset of pixels of the original image; each pixel of the subset is an average value over a predetermined number of neighboring pixels from the original image. The first step during fingerprint matching is to compare outline models. Matches may be discovered at the outline level and then compared at the details level. Detailed matches may then be supplemented by required details, and then further to be compared at the fine details pore level.

Images acquired by the fingerprint imager 110 of FIG. 4 are 6.1 mm by 7.7 mm, in one embodiment. This relatively large fingerprint is usually divided into one or more smaller regions that are individually used to construct individual model(s) (step 1510). These model regions can either be chosen manually to capture particularly interesting features found in a specific region, or they can be chosen automatically using adjustable software settings that define the number of regions, region size, and region locations. Their size is preferably chosen to be large enough to include numerous characteristic features and small enough to reduce problems associated with plastic deformation of the skin and to minimize computation time by using a smaller relative model size. The features identified in a sub-region of the complete fingerprint are referred to as a "feature set." A trained model comprises a collection of all of the feature sets for a particular fingerprint, or several trained models may each contain feature sets for a portion of the particular print Features, for each resolution level and in each region of the fingerprint chosen to be part of the trained model, are identified using gray-level gradient edge detection procedures (step 1515) and extracted. The gradient is first estimated for each of the pixels of the model using one of a relatively large number of procedures that have been developed for this process (see for example D. A. Forsyth, and J. Ponce, "Computer Vision A Modern Approach", Prentice Hall, New Jersey, 2003, chapter 8).

A particularly useful procedure that is often used to estimate gradients is to apply a Gaussian noise filter to the image and then to perform the gradient calculation using a "finite differences" algorithm. After calculation of the gradients, an image point with a locally maximal gradient in the direction of the gradient is identified and marked as an edge point. The next step is to identify neighboring edge points. This is usually accomplished by finding the nearest pixels to the original edge point that lie in a direction that is approximately perpendicular to the gradient direction that passes through the first edge point. The gradient values for these new pixels are determined, and the pixel with a gradient that is (i) maximal along its gradient direction and (ii) has a value that exceeds a threshold is assigned to be the next edge point. This procedure is continued either until the edge is terminated or the edge closes with itself to form a continuous curve. Edge termination occurs at the previously determined edge point if the gradient of a candidate edge point is less than the threshold. In the next step a previously unvisited edge point is identified and its edge is traced according to the steps outlined above. This whole process is repeated until all of the potential edge points have been considered. Automatic software procedures are then used to distinguish fingerprint features from noise. Real edges, for example, must define features that have a minimum width. In addition, lines that do not enclose pores must extend for a minimum distance in order to be considered as legitimate feature edges. Further, pores only occur in ridges and not in valleys. Additional rules may be applied by adjusting software settings. Optional steps allow the models to be manually edited by adding or deleting features (step 1520) and allow users to indicate certain features of the model that must be present for a successful match (step 1525). All editing is performed on the features and not on the original image, which is deliberately protected from any alteration. Examples of features that are identified by this procedure were introduced above in reference to FIGS. 10-12. A number of commercial software applications can be used for edge detection, or custom software applications may be designed for executing the processing described herein. The process 1500 returns (step 1530) to the enrollment process 1300 of FIG. 13.

Referring again to FIG. 13, after feature extraction to produce the trained model, the original fingerprint image and model data 160 is optionally indexed, compressed and encrypted (step 1325), and stored with the model (step 1330). One compression procedure is the Federal Bureau of Investigation (FBI) standard for 500 dpi fingerprints, referred to as Wavelet/Scalar Quantization (WSQ). This is a lossy scheme with a compression ratio of 12.9. According to the FBI standard, the compressed image needs to form a record of the original print that can be used for manual matching and for some automatic matching procedures. Alternatively, a lossless compression technique may be employed for storing the image. The trained model used for matching, on the other hand, requires much less storage space and may be stored with or without compression.

Fingerprint matching is used either to verify the identity of an individual (referred to as 1:1 matching) or to identify the source of an unknown fingerprint (referred to as 1:n search). Both procedures compare a known fingerprint from a database either to a live scan fingerprint for verification or to an unknown fingerprint for identification. This fundamental step of fingerprint matching is the same for both verification and identification.

Fingerprint verification is a particularly important type of fingerprint matching. Fingerprint verification compares a live scan image to an enrolled image in order to authenticate the identity of the individual presenting the live scan fingerprint. Flow diagrams for fingerprint verification are shown in FIGS. 16, 17, 18 and 19.

A user first presents identification (step 1605), such as a passport, license, smartcard or other ID, name or password any of which may be used to provide or to look up his/her previously enrolled fingerprint model(s). Note that the models may be looked-up or stored on the ID, depending upon the application. Then, a live scan, high-resolution fingerprint of the user is acquired in real time (step 1620), and "outline," "details," and "pores" features for the complete fingerprint are extracted (step 1625), as illustrated in reference to FIGS. 9-12.

Figure 16:
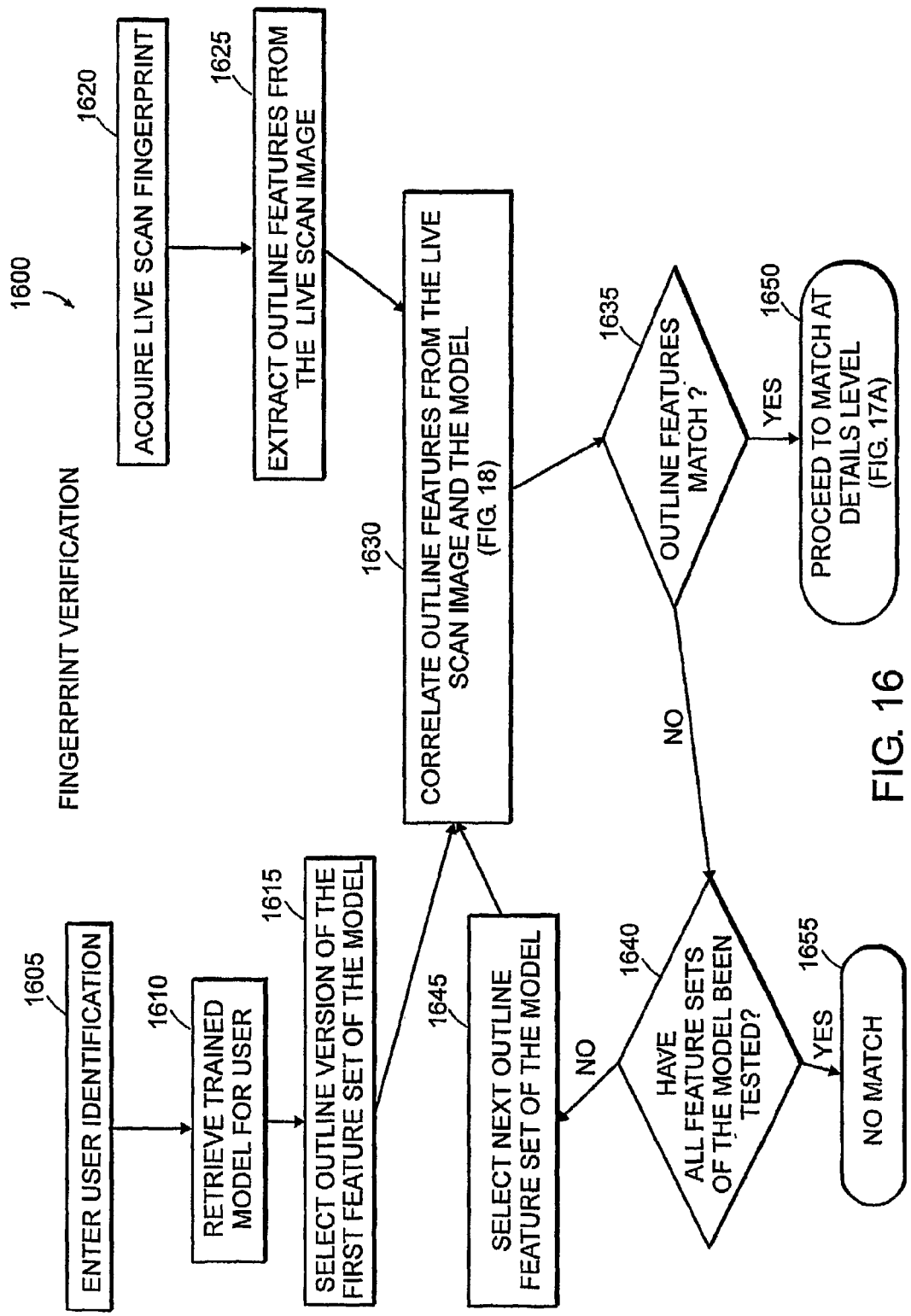
FIG. 16 is a flow diagram of fingerprint verification that is part of the analysis software of FIG. 6B.

FIG. 16 is a flow diagram of the initial process 1600 for fingerprint verification at an "outline" resolution level. An outline feature set from the trained model (steps 1610, 1615) of the user is compared to the corresponding features from the live scan image (step 1630) according to a process described below in reference to FIG. 18. This comparison is repeated until either a match is found or all of the feature sets of the model have been compared to the live scan outline features (steps 1635, 1640, 1645). If no match is found, the process 1600 ends (step 1655), and further processing at the details level does not occur for that particular model. If a match candidate is found at the outline level (step 1635), the matching procedure is repeated at the details level (process 1650) according to FIG. 17A.

Figure 17A:
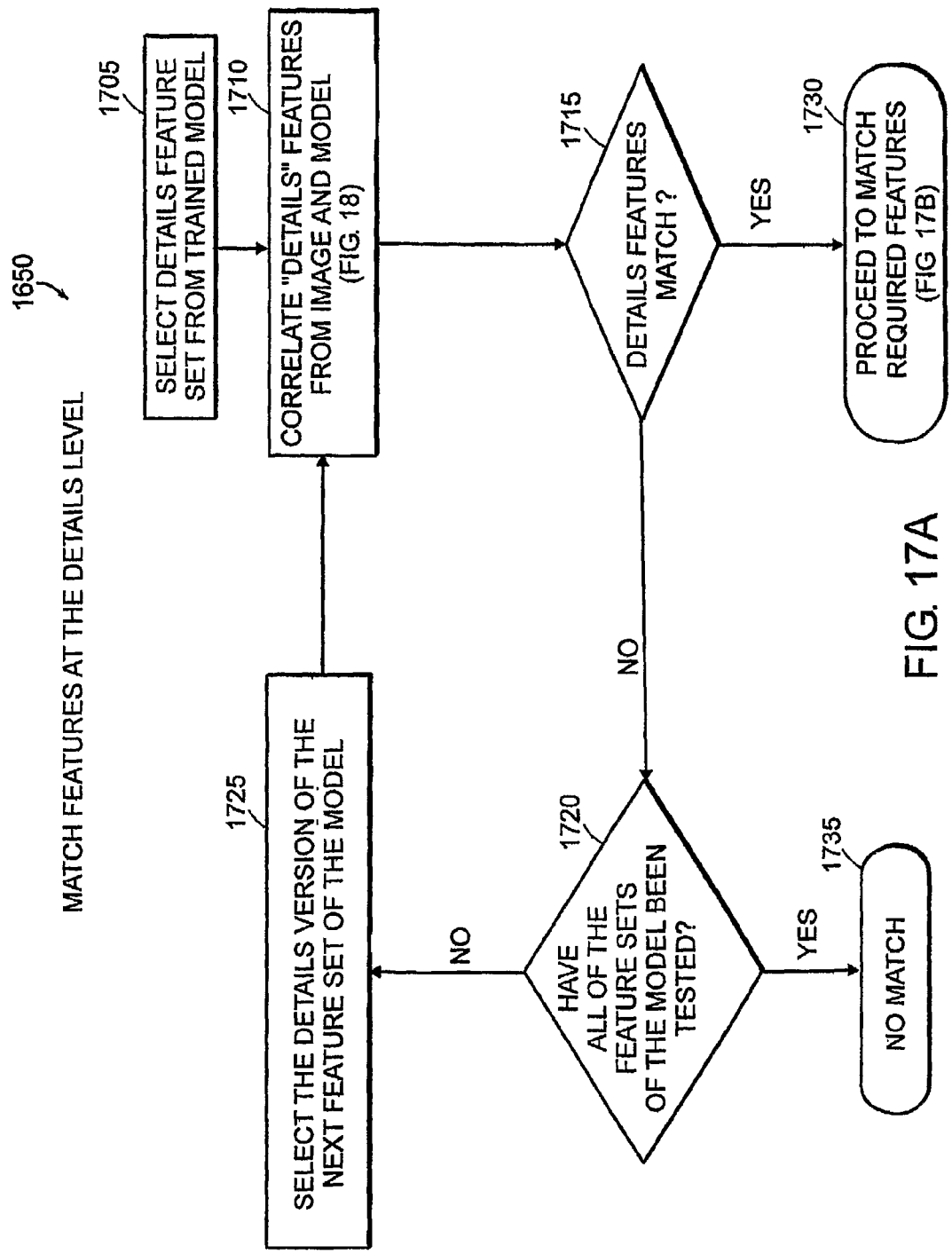
FIG. 17A-17C are flow diagrams of a matching processes beyond the outlines level executed by the fingerprint verification process of FIG. 16.

FIG. 17A is a flow diagram of the process 1650 for fingerprint verification at the "details" resolution level. The process 1650 selects a details feature set from the trained model (step 1705). The process 1650 compares the details features from the image and model (step 1710) according to the process of FIG. 18, discussed below. This comparison is repeated until either a match is found or all of the feature sets of the model have been compared to the live scan details features (steps 1715, 1720, 1725). If no match is found, the process 1650 ends (step 1735), and further processing at the required features level does not occur for that particular model. If a match candidate is found at the details level (step 1715), and no "required" or fine details "pores" features are specified (i.e., details threshold is met), then a positive match is declared. If a match candidate is found at the details level (step 1715) and "required" and/or "pores" are specified in the matching requirements, the matching procedure is repeated for required features (process 1730) according to FIG. 17B.

Figure 17B:
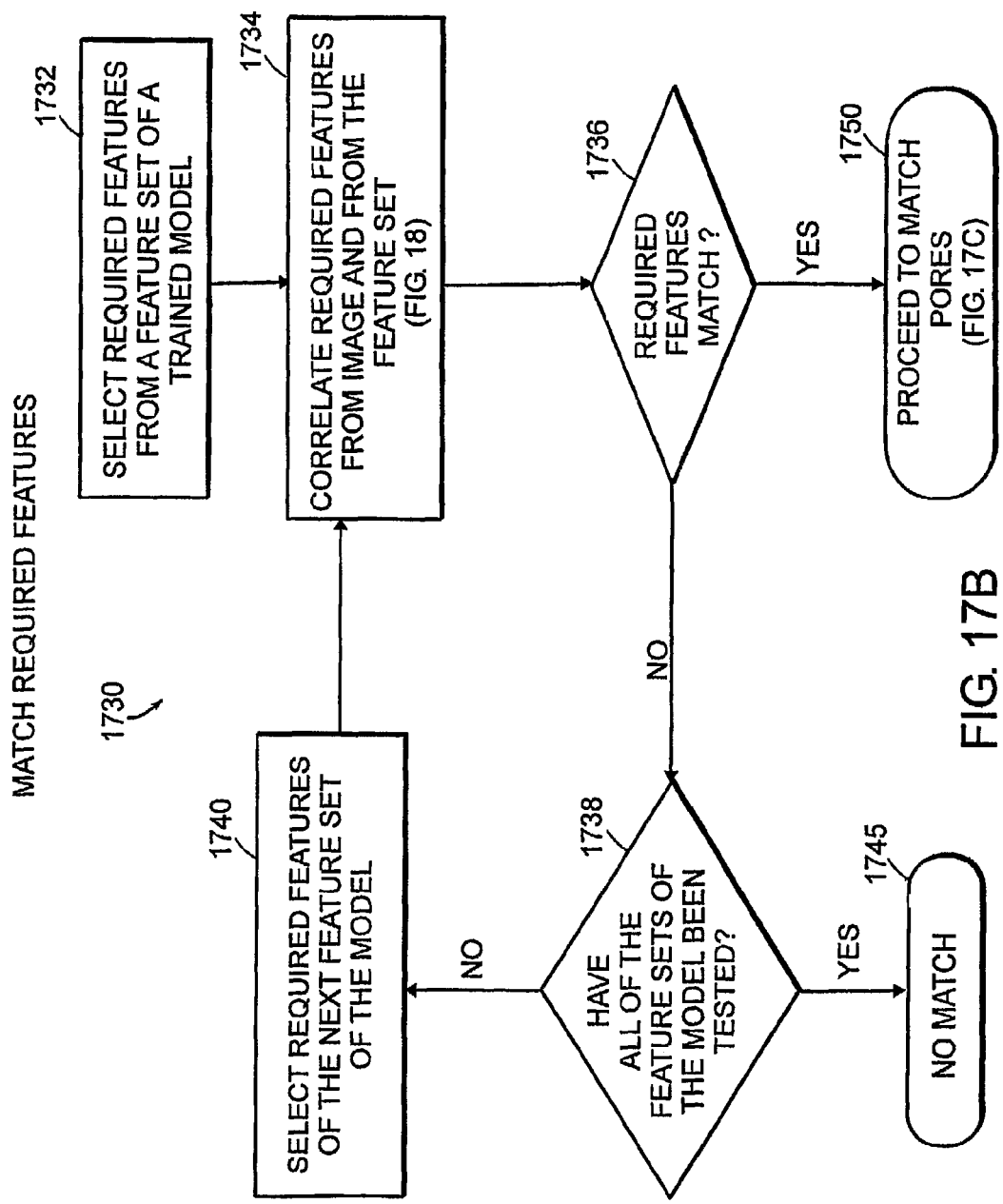

FIG. 17B is a flow diagram of the process 1730 for fingerprint verification of [the optional] required features. The process 1730 selects required features from a feature set from a trained model (step 1732). The process 1730 compares the required features from the feature set of the model to features identified in the live scan image using the same resolution that was used to obtain the required features of the model (step 1734), according to the process of FIG. 18, discussed below. The comparison is repeated until either a match is found or all of the feature sets of the model at the required features level have been compared to the live scan image (steps 1736, 1738, 1740). If no match is found, the process 1730 ends (step 1745), and further processing for pore matching does not occur for that particular model. If the required features match (step 1736), the matching procedure is repeated for pores at the "fine details" level (if any, process 1750) according to FIG. 17C.

Figure 17C:
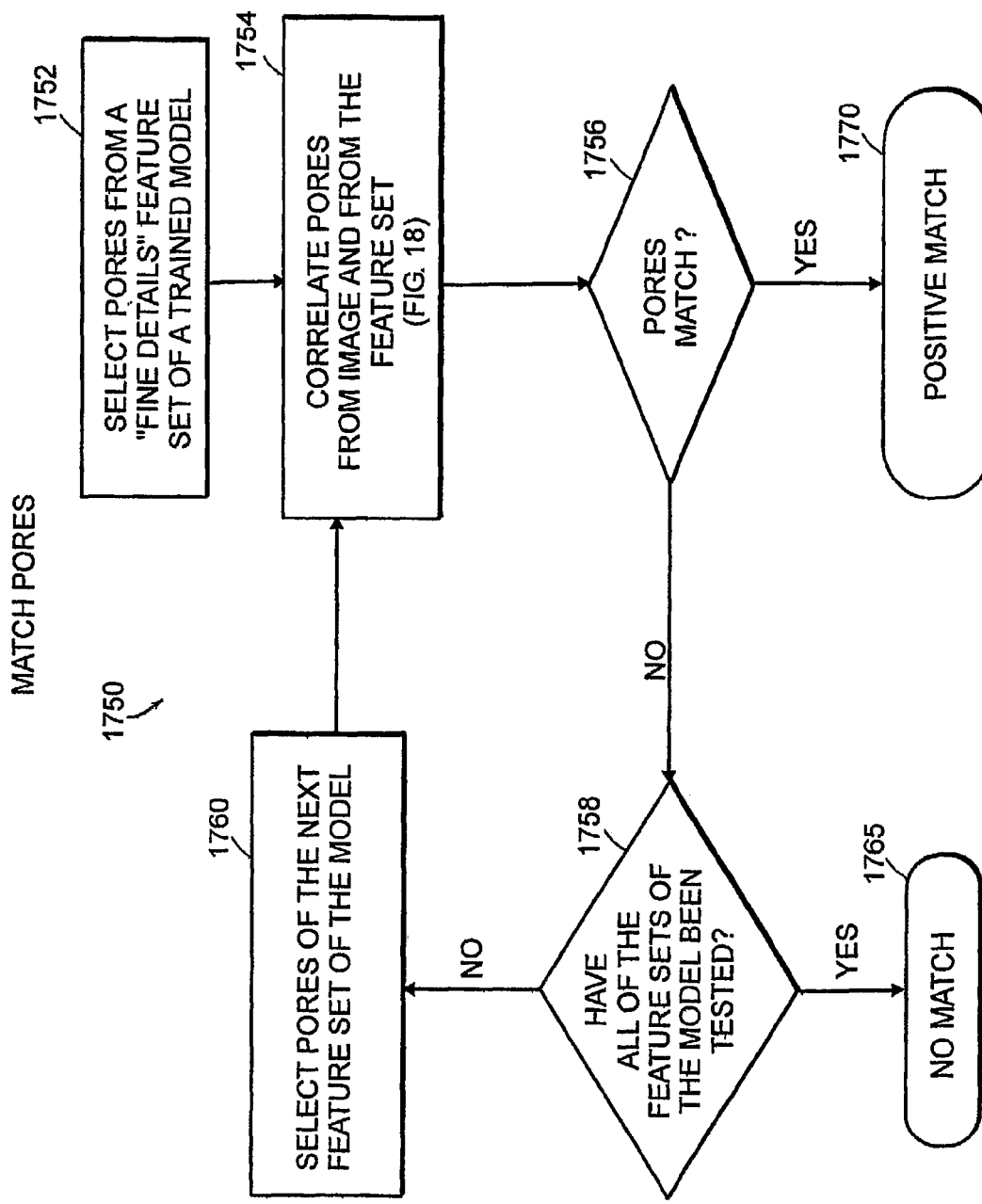

FIG. 17C is a flow diagram of the process 1750 for fingerprint verification of the optional pores at the "fine details" resolution. The process 1750 selects pores from a feature set from a trained model at the fine details resolution (step 1752). The process 1750 compares pores from the feature set of the model to pores identified in the live scan image (step 1754) according to the process of FIG. 18, discussed below. The comparison is repeated until either a match is found or all of the feature sets of the model at the fine details level have been tested. If the pore features threshold is met, a positive match is declared (step 1770).

Figure 18:
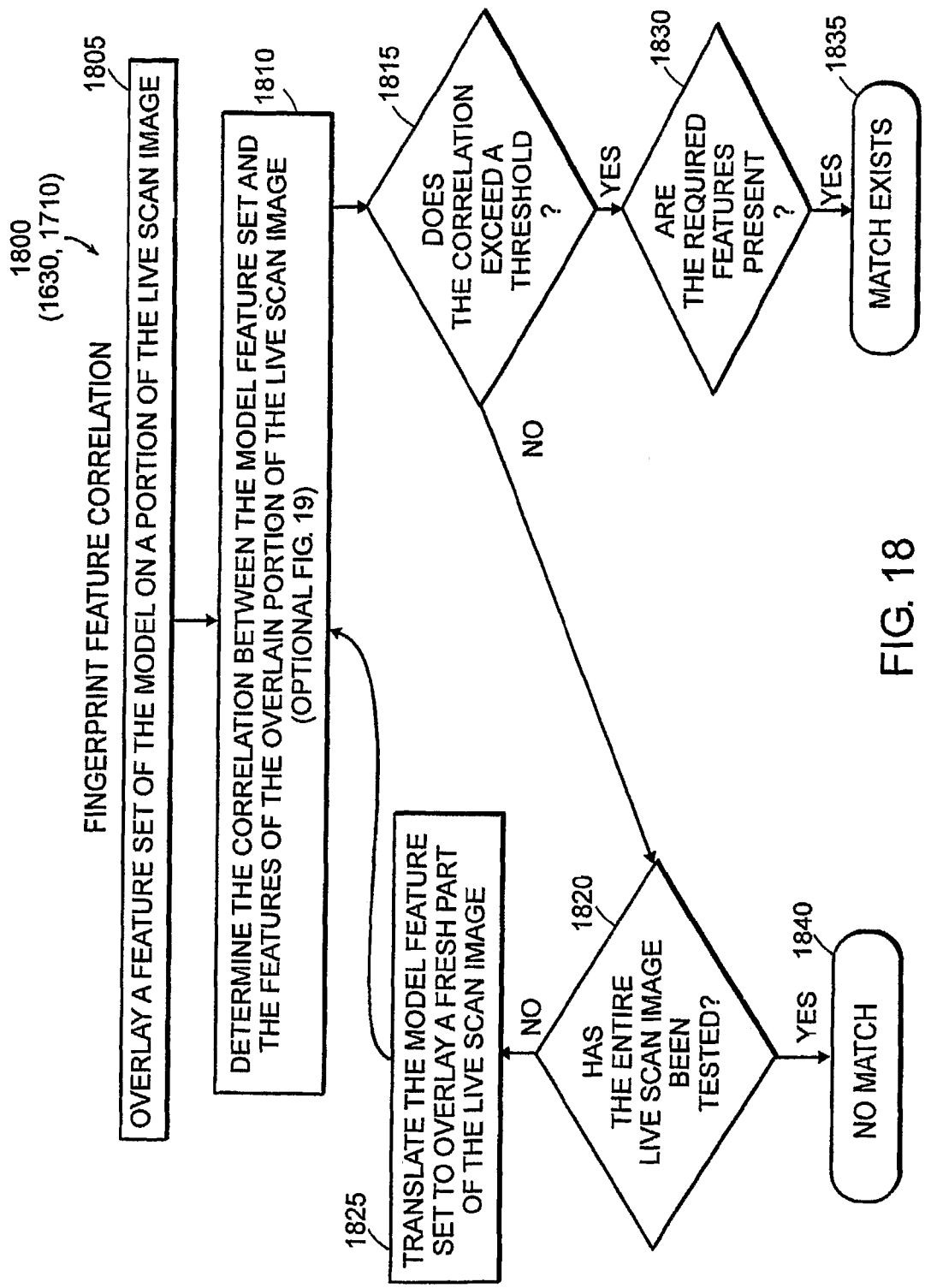
FIG. 18 is a flow diagram of a fingerprint feature correlation process executed by the processes of FIGS. 16 and 17.

FIG. 18 is a flow diagram outlining the process used to determine if a match exists between a trained model and a present image, such as a live scan fingerprint image, which is used now as an example. Fingerprint features are correlated at either the outline, details, or fine details resolutions (steps 1630, 1710, 1734, 1754). A model feature set is overlain on a feature set of the entire live scan image (step 1805). Since the model feature set is generally smaller, it will overlap only a portion of the live scan feature set. A correlation is then calculated between the model feature set and the portion of the live scan image that it overlays (step 1810). There are a number of procedures that are commonly used to determine correlation between images (for example, Maltoni, Maio, Jain, and Prabhakar, "Handbook of Fingerprint Recognition", Springer, 2003, chapter 4). A particularly useful procedure considers the similarity of two images to be indicated by their "cross correlation" (for example, Maltoni, Maio, Jain, and Prabhakar, "Handbook of Fingerprint Recognition", Springer, 2003, chapter 4). Using this procedure, the cross correlation between the live scan image and the model feature set is calculated as the feature set expands, contracts, and rotates, over predetermined limits, with respect to the live scan image that it overlays. The feature set is then translated to a new section of the live scan image (step 1825), and the cross correlation calculation is repeated. This process is followed for all the feature sets of the model (step 1820). A match is achieved (step 1830) if a cross correlation exceeds a threshold (step 1815), and if a predetermined percent of features match with the live scan image features (step 1830). Otherwise, there is no match (step 1840).

Figure 19:
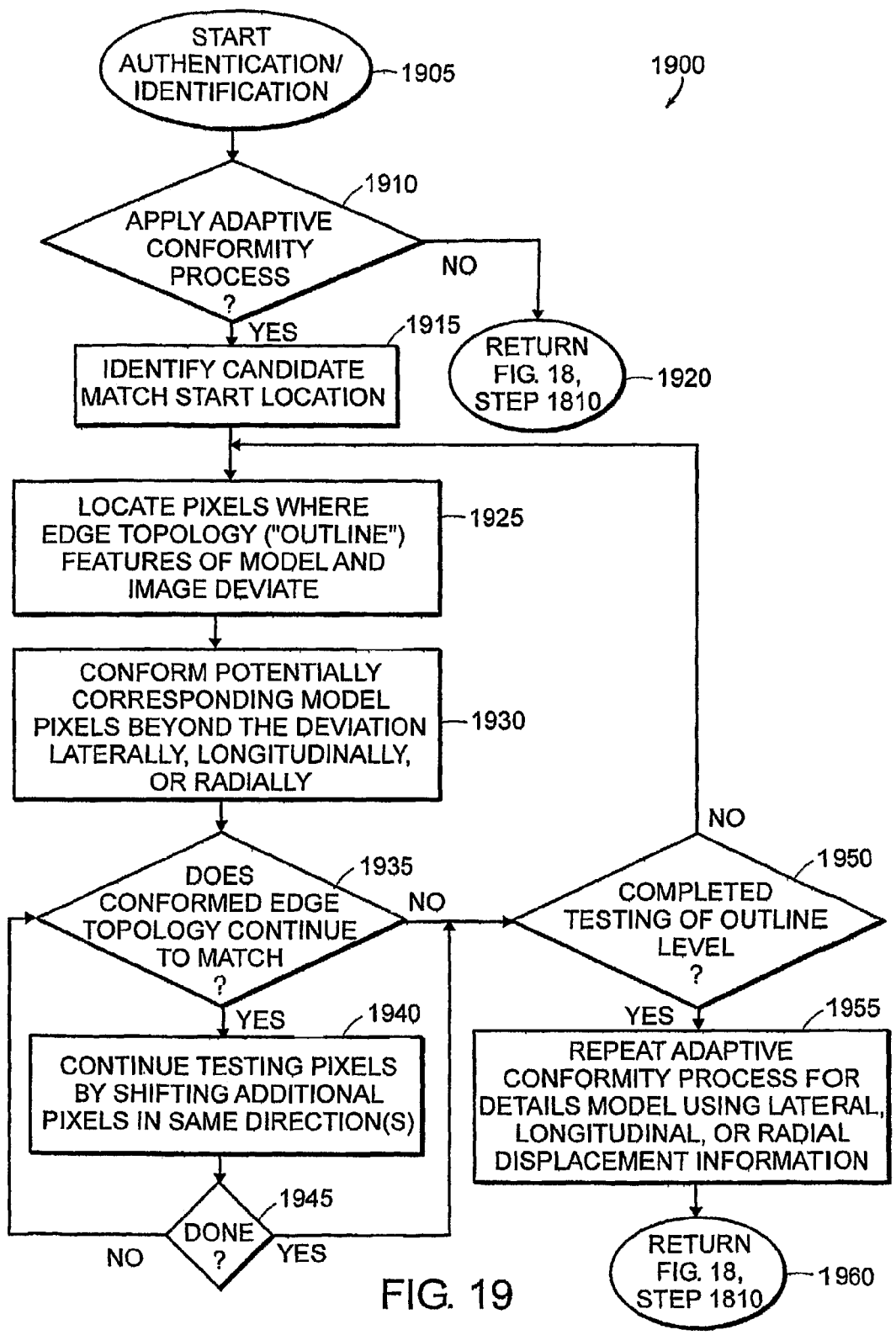
FIG. 19 is flow diagram of an adaptive conformity process executed by the fingerprint feature correlation process of FIG. 18.

FIG. 19 is an "adaptive conformity" process 1900 optionally executed in determining the correlation (step 1810). The adaptive conformity process 1900 is used to improve performance of the correlation process of FIG. 18. Adaptive conformity allows for matching of fingerprint features in cases where linear or non-linear shifting of the fingerprint features occurs either in the original fingerprint from which an outline, and/or details, and/or fine details level model(s) is derived, or in imaging a live scan fingerprint image. Such linear or non-linear shifting is caused by elasticity of the skin in combination with pressing the finger 105 into the imaging surface (e.g., lens 415) in various ways, such as through applying pressure in latitudinal, longitudinal, or rotational directions or in an excessively hard or light manner. In the latitudinal, longitudinal, or rotational cases, part of the fingerprint may be imaged normally, and compression, extension, or rotation may occur in another part of the fingerprint. In the excessively hard or light pressure cases, part or all of the fingerprints may include thicker or thinner ridge 905 sizes, respectively. The adaptive conformity process 1900 allows the shape of the model to adaptively conform to account for non-uniformity of fingerprinting but in a manner that does not alter or change the features in any way, thereby maintaining the integrity to the identification and verification processes according to the principles of the present invention. Similar shapes, details, and pores that are shifted slightly due to distortion are recognized as the same shapes, but in a slightly different relative position than they were on a previous acquisition. The principles of the present invention allow for highly accurate recognition of level three details even if distortion from previous enrollment has taken place, which is normal to some degree in any set of fingerprint images. In addition, better accuracy to match is obtained with slight changes due to wear of ridges, scarring, dehydration, and pressure.

Referring specifically to FIG. 19, the adaptive conformity process 1900 may be executed for authentication or identification (i.e., verification) processes, and with any image source including but not limited to latent images. After starting (step 1905), the process 1900 returns to the fingerprint feature correlation process 1800 of FIG. 18 if adaptive conformity is not selected to be applied by the user (step 1920). In one embodiment, the user may select adaptive conformity to be selected through toggling a Graphical User Interface (GUI) control. If adaptive conformity is selected, the process 1900 identifies a candidate match start location (step 1915), such as the core (i.e., center of fingerprint "swirls"), and uses the start location as a "base" from which to apply the adaptive conformity linear or non-linear processing.

After identifying the start location, the process 1900 locates the pixels where edge topology (i.e., outline level) features of the model and the image deviate. Using the deviation point as a "base point of adaptive conformity," the process 1900 attempts to conform potentially corresponding model pixels beyond the base point laterally, longitudinally, or radially (step 1930) with the fingerprint features of the live scan fingerprint image. Conforming the potentially corresponding model pixels means to shift the model pixels in a predetermined direction without changing the shape of the outline or details features of the model. If the chosen predetermined direction is correct, the shifting of the edge topology continues by shifting pixels in the same direction from the base deviation while the shape of the edge topology continues to match (steps 1935, 1940, and 1945) or until the edge topology being examined is complete. If the chosen predetermined direction is incorrect, other directions may be tried. Distance ranges for allowing pixels to move in attempting to adaptively conform can be specified by the user but are limited in range to that typical of these types of distortions.

Additional testing at the outline level continues (step 1950) until the outline feature sets of the model are compared with the outline features of the live scan image (steps 1950 and 1925-1945). Following comparison of the outline features, the process 1900 repeats the adaptive conformity process at the details level (step 1955). The process 1900 returns to the process of FIG. 18 at step 1810 following completion (step 1960) at the details level. In an alternative embodiment, if the matching at the outlines level does not achieve a predetermined threshold, the processing at the details level (step 1955) is skipped with an appropriate message being passed to the process of FIG. 8.

Fingerprints from an unknown individual can sometimes be identified by comparing the unknown print to a database of known prints; this is referred to as 1:n fingerprint identification. A particularly advantageous procedure is to compare fingerprints in a database of high resolution fingerprints that were acquired and processed according to the processes of FIGS. 13-15 with a high resolution unknown fingerprint. In this case, each fingerprint in the database has an associated "outlines" and "details" and optionally, a "required" and "pores" feature set that encompasses the entire fingerprint image. A trained model is formed from the unknown fingerprint and compared to the feature sets of the database. To save computation time, the comparison is first made at the "outline" resolution level. The subset of candidate fingerprints that match at the outline resolution level is subsequently compared at the "details," and optionally at "required" or "pore" resolution(s).

It is also possible to compare a relatively low resolution unknown print to prints in either a high or a low resolution database. In these cases, the feature set for the unknown fingerprint includes only ridge patterns and does not contain information on ridge profiles, ridge shapes, or pores. The processes described herein exhibit enhanced reliability over minutiae-based systems even in this case since all of the information of the fingerprint is used for comparison and not just a few minutiae points.

In most examples of fingerprint identification, appropriate linear scaling might be necessary since the unknown fingerprint may have been acquired at a different magnification from the fingerprints in the comparison database. The GUI 620 allows a user to graphically mark a line having start and end points of a scale (e.g., ruler) imaged with the original fingerprint and assign a length value to the length of the line. In this way, proper scaling can be applied for comparison against a live scan image, for example.

Similarly, appropriate angular rotation might be necessary since the unknown fingerprint may have been acquired at a different angle than the fingerprints in the comparison database. The GUI allows a user to indicate a range of rotation (e.g., + or −30 degrees) to check the live scan image against the outline level of the comparison model. In this way, proper orientation can be obtained for the comparison, and subsequent details, required, and pore features can then be applied at the same rotation, for example. Checking a larger degree of scale and/or rotation takes more computing time, so faster compare times are achieved if some degree of normalization is first preprocessed in order to limit the degree of scaling and/or rotation that is required for reliable operation of the system.

In addition to the processing described above, the principles of the present invention support preprocessing that can improve performance of the processing (i.e., modeling and comparisons). Example forms of preprocessing include: image orientation and rotation, sub-sampling, decimating, binning, flattening the field, accounting for defective pixels in the sensor array 215, encrypting the image data 160, applying a watermark, and attaching sensor information.

Figure 20A:
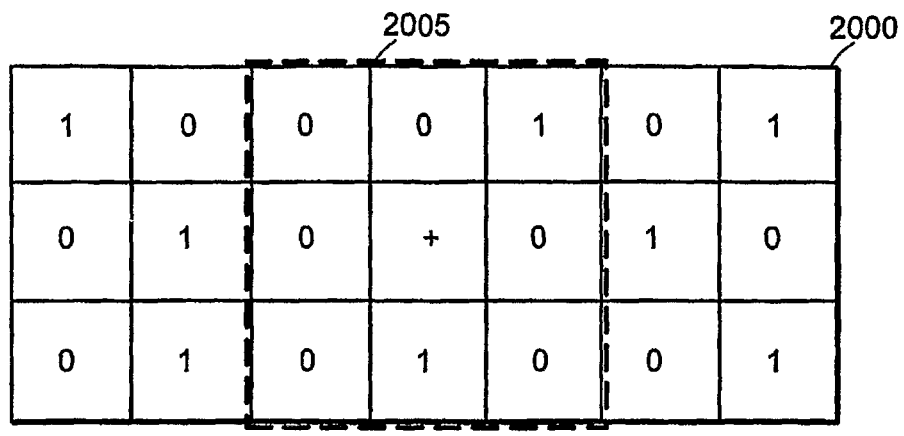
FIGS. 20A and 20B are diagrams including a set of pixels in the sensor array of FIG. 3A that illustrates preprocessing for correcting bad pixels.
Figure 20B:
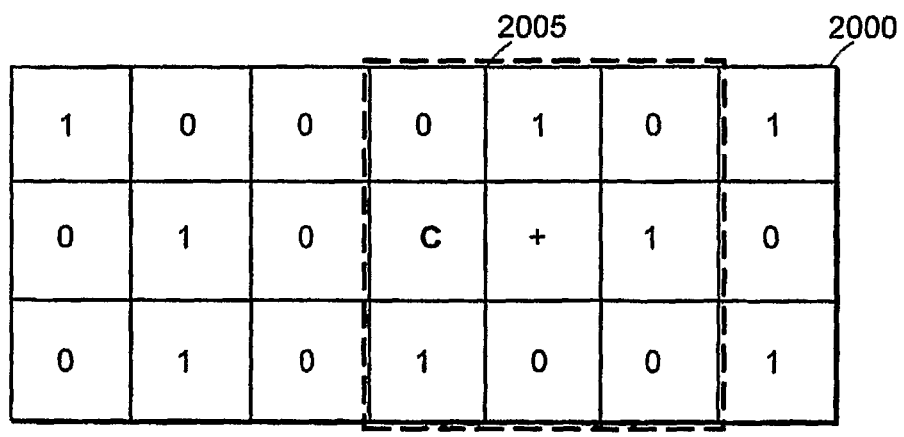

FIGS. 20A and 20B are illustrations of one form of preprocessing, namely accounting for defective pixels. Referring first to FIG. 20A, a grid 2000 illustrates an example of a small region of pixels in the sensor array 215. The processing region of interest 2005 starts at a first position. In this embodiment, the processing region of interest is composed of an array of 3×3 pixels. Alternative embodiments may utilize alternative array sizes (5×5, 9×9, etc) or alternative array shapes (rectangular) ultimately determined by the desired resolution of the fingerprint sensor and the desired image quality. In the present example, there are multiple bad pixels in the sensor array 215, each represented by a zero '0'. Among the pixels, there are known good pixels represented by a one '1'. In the center of the processing region of interest 2005 is a pixel of interest, represented by a plus sign '+'. In this example, the pixel of interest, if a defective pixel, may be corrected by obtaining an average of at least two neighboring pixels within the processing region of interest 2005. The average value of the neighboring pixels can then be assigned to the defective pixel of interest. Once a pixel of interest has been corrected (if necessary), the processing region of interest 2005 is moved by one pixel spacing in order to address the next pixel in the array. The direction of movement of the processing region of interest 2005 may be in the most convenient direction for processing efficiency or dictated by the architecture of the particular system.

FIG. 20B is an example of the shifting of the processing region of interest 2005 to a neighboring pixel on the pixel array 2000. Noting that the pixel of interest previously corrected in FIG. 20A is now denoted as a 'C' pixel in FIG. 20B, the processing region of interest corrects the next pixel of interest (also denoted by a + in FIG. 20B) by averaging two known good pixels from within the processing region of interest 2005. In alternative embodiments, previously corrected pixels (denoted as 'C' in FIG. 20B) may be used as a good pixel for the purposes of correcting the new, defective pixel of interest.

Although this embodiment averages the intensities of two known good pixels within each processing region of interest to correct for a defective pixel, alternative embodiments may average the intensities of more than two known good pixels. In yet another embodiment, a defective pixel of interest may be replaced by intensity data from one known good pixel from within the processing region of interest 2005, wherein the processing region of interest 2005 may be of an array size larger than 3×3 or the processing region of interest array size may not be a square two-dimensional array.

The other examples of preprocessing are now described without reference to associated figures.

Subsampling is a form of reducing the amount of data sampled by the fingerprint camera 120. Instead of reading data from every pixel of the sensor array 215, the camera 120 reads a subset of the pixels in a predefined manner, which is preferably selectable by the user. Decimating is another form of reducing the data, but reduces the amount of data after the data has been read from all or substantially all the pixels of the sensor array 215. Binning is a technique for reducing the amount of data representing the fingerprint by averaging data of multiple pixels into a single value; for example, four pixels may be averaged as a single average value to reduce the data by a factor of four.

Flattening the field is also referred to as correcting for uneven illumination of the fingerprint image. Uneven illumination of the image may be caused by many sources, such as the light source 205, the propagation path of the light beam 207, the optics 210 (including the optical elements 250 or HOE 255), or the gain or offset of the pixels of the sensor array 215. Testing for uneven imaging of the fingerprint may be done during a calibration phase prior to acquiring an image of a fingerprint, where a reflection off the fingerprint imaging surface is used as the source and calibration data is determined and stored in the microprocessor memory 355 (FIG. 3B), for example. The calibration data is applied during live scanning of a fingerprint 115.

In addition to reducing data or correcting for imaging or equipment issues, the preprocessing may also be used to apply additional information to the image data 160. For example, the image data 160 may be encrypted using various forms of well-known encrypting techniques. A header may be applied to add a variety of equipment-related information or other information that may be useful to determine the source of the equipment or understand the environmental conditions that were present when the fingerprint was imaged for use at a later time, such as during authentication or authorization. Example information may be the manufacturer, model and serial number of the instrument supplying the image data 160 representing the portion of the fingerprint, date of fingerprinting, time of fingerprinting, calibration data associated with the instrument used to acquire the image, the name of the operator logged onto the operating system, the unique ID of the computer that was used to acquire the image, and temperature at the time the image was acquired.

A watermark may also be associated with the data. An example technique for applying a watermark is to use extra data bits associated with each pixel to represent a portion of the watermark. For example, if each data pixel only represents two hundred fifty-six ($2^8$) levels of gray-scale, two bits of a ten-bit word may be used to represent a portion of a watermark. The watermark may be information that would otherwise be part of a header or may be information that is used to determine whether any tampering has occurred with the fingerprint image.

The processing and preprocessing discussed herein may be implemented in hardware, firmware, or software. In the case of software, the software may be stored locally with a processor adapted to execute the software or stored remotely from the processor and downloaded via a wired or wireless network. The software may be stored in RAM, ROM, optical disk, magnetic disk, or other form of computer readable media. A processor used to execute the software may be a general purpose processor or custom designed processor. The executing processor may use supporting circuitry to load and execute the software.

While this invention has been particularly shown and described with references to preferred embodiments thereof, it will be understood by those skilled in the art that various changes in form and details may be made therein without departing from the scope of the invention encompassed by the appended claims.

For example, in FIG. 1, the fingerprint sensor 100 and local computer 130 are distinct devices with a majority of the processing occurring in the local computer 130. In an alternative embodiment, the fingerprint sensor 100 includes an embedded processor capable of performing preprocessing as well as some of the processing functions of the local computer 130, as discussed in general in reference to FIGS. 6A and 6B and in detail in reference to FIGS. 13-20. Also, the processing may be done in the remote computer 150.

The control channel/data link 125 or other links 132, 152, 145 may be wired or wireless links, such as through Radio Frequency (RF) or infrared communications. In another embodiment, the fingerprint sensor 100 may have IEEE 802.11, cellular communications (e.g., Code Division Multiple Access (CDMA)), or other wireless capability to interface directly to a wireless node (e.g., base station, not shown) in the computer network 140.

The local and remote databases 135, 155 may be any form of database and located with or distinct from the associated computers or distributed about the computer network 100. There may also be security provisions associated with the databases 135, 155 so as to prevent tampering with the fingerprint image data and models 170 stored therein.

In FIGS. 3A and 3B, real-time automatic feedback control of power, angle, or wavelength is illustrated. In alternative embodiments, mechanisms to allow for manual adjustments may be provided. Also, periodic, random, or calibration period adjustments instead of real-time feedback control may be employed to reduce power consumption. The power source for the fingerprint sensor 100 is described above as being the local computer 130 via Firewire or other interface; however, it should be understood that the power source may be a battery (not shown) or AC-to-DC power converter with sufficient filtering circuitry to achieve the high-resolution images. Also, the sensor array 215 may be a CCD array or any other array adapted for use in the fingerprint imaging application for achieving resolution sufficient to detect the fingerprint features described herein.

In FIGS. 6A and 6B, the software 610 may be any language adapted to be executed in the fingerprint sensor 100, local computer 130, or remote computer 150. For example, the software may be assembly language, 'C', object-oriented C++, Java, or combinations thereof. It should be understood that the processing and display of live scan images should be displayed in near-real-time, preferably with outline or details models displayed thereon.

FIG. 7 may omit the preprocessing 710 and processing 715 of the image data 160. Instead, the image data 160 may be stored in one of the databases 135, 155, for example, and processed according to the preprocessing 710 or processing 715 techniques as described herein in a post-processing, non-real-time manner. Additionally, in another embodiment, after images are captured by the fingerprint sensor 100 and indexed and stored, certain software-based enhancements may be performed, if needed, at the option of a system configuration administrator or for other beneficial reasons. Certain enhancements that do not alter the original image or its unique characteristics can be performed to enhance image analysis, such as mean low-pass filtering or automatic level adjustment to improve contrast or other methods that include, but are not limited to, gray-scale gradient edge detection techniques for pattern recognition and subsequent matching techniques, or combinations thereof.

A number of commercial software applications can be used for edge detection, including Aphelion from Amerinex Applied Imaging, Hexsight software from Adept, Vision Blox distributed in the U.S.A. by Image Labs, and Halion from The Imaging Source.

FIG. 8 illustrates a gradient edge detector 805 and modeler 810 as distinct operational units. In alternative embodiments, these two operational units 805, 810 may be combined into an integrated operational unit or distributed and executed about multiple processors. Further, the image data and model(s) 170 may be stored in the local database 135, as shown, or stored in different databases for size, security, or administrative reasons.

FIGS. 9-12 are fingerprint images 900 embodied in high-resolution image data 160 representing the fingerprint 115. Because the processing described herein is robust, the image data 160 may be lower resolution than illustrated and still achieve the desired matching results. In addition, the gradient edge detection processes described herein can accomplish the modeling and comparing processes at poor contrast levels without significant degradation to the results. However, the user may choose to lower a matching threshold at either outline or details levels to account for poor contrast levels in the original fingerprint image.

FIGS. 13-20 are illustrative flow diagrams. The flow diagrams may be varied in any manner that accomplishes the processing and storage tasks suitable for achieving the acquisition, modeling, and verification aspects according to the principles of the present invention.

What is claimed is:

1. A method for processing an image of a biometric comprising:
    applying a gradient edge detection process, using a gradient edge detector, to detect structural features in a biometric based on data representing an image of at least a portion of the biometric; and
    forming a model, using a modeler, of the image as a function of the detected structural features wherein forming a model of the image includes modeling at least one region of the image of the at least one portion of the biometric.

2. The method according to claim 1 wherein forming a model of the image includes constructing the model for at least two resolutions.

3. The method according to claim 2 wherein the resolutions include an outline model at a low resolution and a details model at a high resolution.

4. The method according to claim 3 wherein the biometric is an area of skin with a friction ridge pattern, the outline model includes edge topology of ridge features, and the details model includes edge topology and specifics of ridge deviations and locations and sizes of pores.

5. The method according to claim 2 wherein the resolutions include an outline model at a low resolution, a details model at a high resolution, and a fine details model used to locate and define particular biometric features more accurately than at the low or high resolutions.

6. The method according to claim 2 wherein the biometric is an area of skin with a friction ridge pattern and constructing the model includes identifying, outlining, and extracting ridge deviation detail and pore features.

7. The method according to claim 6 wherein the ridge deviation detail includes ridge contours including scars; and
    the pore features include position, shape, and sizes of pores.

8. The method according to claim 2 wherein the biometric includes at least one of the following:
    ear shape and structure, facial or hand thermograms, iris or retina structure, handwriting, fingerprints, palm prints, foot prints, toe prints.

9. The method according to claim 1 wherein a gradient is estimated for each pixel of the model after applying a noise filter to the image.

10. The method according to claim 1 wherein the detection process includes using a finite differences process.

11. The method according to claim 1 wherein the detection process includes:
    after calculating the gradients, identifying and marking an image point as an edge point having a locally maximal gradient in the direction of the gradient that exceeds a threshold;
    identifying neighboring edge points by finding nearest pixels to the original edge point that lie in a direction that is approximately perpendicular to the gradient direction that passes through the first edge point;
    for the nearest pixels, determining gradient values and, for the pixel with a gradient that is maximal along its gradient direction and has a value that exceeds a threshold, assigning the pixel to be the next edge point;
    continuing either until the edge is terminated or the edge closes with itself to form a continuous curve;
    terminating the process at the previously determined edge point if the gradient of the candidate edge point is less than the threshold; and
    repeating the process until all potential edge points have been considered.

12. The method according to claim 1 further including automatically distinguishing biometric features from noise.

13. The method according to claim 12 further including characterizing the noise as a biometric feature that is below a minimum width or extends less than a minimum distance.

14. The method according to claim 1 further including supporting manual editing of features and selecting features that must be present for a successful match.

15. The method according to claim 1 wherein forming a model of the image includes overlapping portions of multiple regions.

16. The method according to claim 1 wherein forming a model of the image includes allowing a user to add, extend, or delete features.

17. The method according to claim 1 wherein forming a model of the image includes allowing a user to identify features that must be present for a match.

18. The method according to claim 1 wherein forming a model of the image includes allowing the user to adjust the size or position of the model relative to the biometric.

19. The method according to claim 1 wherein the image is a previously stored image; and forming a model of the image includes normalizing a size of the image as a function of a scale associated with the image.

20. The method according to claim 1 wherein the biometric is an area of skin with a friction ridge pattern and the features include ridge structure with ridge deviation detail.

21. The method according to claim 1 further including displaying the image to a user with an overlay of indications of the biometric features of the image.

22. The method according to claim 1 further including displaying the image to a user with an overlay of indications of filtered biometric features according to a selectable criteria.

23. The method according to claim 1 further including automatically rotating the image to a specified orientation for displaying to a user.

24. The method according to claim 1 wherein the image is a gray-scale image.

25. The method according to claim 1 further including adding the image of the at least a portion of the biometric to a database.

26. The method according to claim 25 wherein adding the image includes storing the image and the model of the image in the database.

27. The method according to claim 25 wherein adding the image includes storing the image at full sampled resolution.

28. The method according to claim 25 wherein adding the image includes compressing the data representing the image prior to storing in the database.

29. The method according to claim 28 wherein compressing the image includes compressing the image in a lossless manner.

30. The method according to claim 25 wherein adding the image includes compressing the model prior to storing the image in the database.

31. The method according to claim 25 wherein adding the image includes encrypting the data or model prior to storing the image in the database.

32. The method according to claim 25 wherein adding the image includes storing the image and the model of the at least a portion of the biometric with associated information.

33. The method according to claim 32 wherein the associated information includes at least one of:

identity of a person associated with the biometric;

manufacturer, model, or serial number of the instrument supplying the data representing the portion of the biometric;

date of biometric imaging;

time of day of biometric imaging;

calibration data associated with the instrument used to acquire the image;

temperature at the time the image was acquired;

unique computer ID receiving the data representing the image from the instrument acquiring the image of the biometric; or name of person logged into the computer at the time the image was acquired.

34. The method according to claim 32 wherein the associated information includes a photograph, voice recording, or signature of the person whose biometric is imaged.

35. The method according to claim 32 wherein the associated information is a watermark.

36. The method according to claim 35 wherein the watermark is identifying information.

37. The method according to claim 35 wherein the watermark includes anti-tampering information.

38. The method according to claim 1 further including comparing a previously stored model from a database to a present image.

39. The method according to claim 38 wherein the present image is at least a portion of a biometric of a person having a known identity.

40. The method according to claim 38 wherein the present image is at least a portion of a biometric of a person having an unknown identity.

41. The method according to claim 38 wherein the present image is received from one of the following sources:

live source, local database, scanned image, or other source.

42. The method according to claim 38 wherein comparing includes comparing outline features of the previously stored model to outline features of the present image to determine (i) whether the present image is a candidate for a match or (ii) whether the previously stored model is a candidate for a match.

43. The method according to claim 42 wherein comparing includes determining whether the comparison exceeds a predetermined candidate threshold.

44. The method according to claim 42 wherein, if the present image is not a candidate for a match, comparing includes comparing outline features of another previously stored model to the outline features of the present image to determine whether the present image is a candidate for a match and if so, using the next previously stored model for details comparison.

45. The method according to claim 42 wherein, if the previously stored model is not a candidate for a match, comparing includes comparing outline features of a next previously stored model to the outline features of the present image to determine whether the next previously stored model is a candidate for a match and if so, using the next previously stored model for details comparison.

46. The method according to claim 42 wherein, if a candidate match of outline features is found, comparing includes comparing details features of the previously stored model with details features of the present image.

47. The method according to claim 46 wherein comparing details features includes determining whether the details comparison exceeds a predetermined threshold.

48. The method according to claim 46 wherein comparing details features includes determining whether required features associated with the previously stored model are found in the present image.

49. The method according to claim 46 wherein the biometric is an area of skin with a friction ridge pattern and wherein comparing includes comparing fine details features, wherein comparing fine details features includes determining whether pore features in the previously stored model are found in the present image.

50. The method according to claim 49 further including indicating which pores in the previously stored model appear in expected locations in the present image, including allowing for distortions that normally occur between successive impressions.

51. The method according to claim 50 further indicating a pore count or a statistical probability of an error in at least cases allowing for distortions.

52. The method according to claim 46 wherein comparing details features includes determining whether the details comparison exceeds a predetermined threshold a specified number of consecutive frames.

53. The method according to claim 52 wherein the details features in successive frames are different.

54. The method according to claim 52 further including selecting another details feature set of the previously stored model for correlating with another details feature set of the present image.

55. The method according to claim 52 further including:
(i) selecting another previously stored model for correlating with a features set of the present image and (ii) declaring a successful match if any model exceeds a predetermined threshold.

56. The method according to claim 38 wherein comparing includes comparing outline features of the previously stored model to outline features of a model of the present image and, if the comparison exceeds a predetermined threshold, comparing details features of the previously stored model to details features of the model of the present image to determine whether the previously stored model and the present image match.

57. The method according to claim 38 wherein comparing includes scaling the previously stored model, present image, or model of the present image.

58. The method according to claim 38 wherein comparing includes rotating the previously stored model, present image, or present model.

59. The method according to claim 38 wherein comparing includes adaptively conforming the previously stored model to account for variability associated with recording or acquiring the present image.

60. The method according to claim 59 wherein accounting for variability includes accounting for an expected location of predefined features.

61. The method according to claim 59 wherein the variability includes stretching of the biometric or portions thereof laterally, longitudinally, or radially.

62. The method according to claim 59 wherein the variability is caused by pressure of the biometric on a medium used to record or acquire the present image.

63. The method according to claim 38 wherein comparing includes comparing the previously stored model against multiple present images until a match is found or comparison with the multiple present images is complete.

64. The method according to claim 38 wherein comparing includes comparing multiple previously stored models against the present image until a match is found or comparison with the multiple previously stored models is complete.

65. The method according to claim 38 wherein comparing includes comparing multiple previously stored models against multiple present images until comparing against the multiple previously stored models is complete.

66. The method according to claim 38 wherein the present image includes multiple biometrics of an individual.

67. The method according to claim 38 wherein the multiple biometrics are different areas of skin with a friction ridge pattern from the same individual.

68. The method according to claim 1 further including comparing previously stored models of multiple biometrics to present images of multiple, respective biometrics.

69. The method according to claim 68 further including determining a combined metric based on the comparisons.

70. The method according to claim 1 further including preprocessing the data representing the image.

71. The method according to claim 70 further including subsampling the at least a portion of the biometric to produce the data representing the image.

72. The method according to claim 70 wherein preprocessing includes decimating the data representing the image.

73. The method according to claim 70 wherein preprocessing includes binning the data representing the image.

74. The method according to claim 70 wherein preprocessing includes correcting for uneven imaging of the at least a portion of the biometric.

75. The method according to claim 70 wherein preprocessing includes accounting for defective pixels of an instrument used to acquire the at least a portion of the biometrics.

76. The method according to claim 70 wherein preprocessing includes encrypting the data representing the image.

77. The method according to claim 70 wherein preprocessing includes changing the image orientation, including changing the image orientation by flipping the image vertically or horizontally or by rotating the image.

78. The method according to claim 70 wherein preprocessing includes attaching sensor information to the data representing the image.

79. The method according to claim 70 wherein preprocessing includes applying a watermark to the data representing the image.

80. The method according to claim 79 wherein the watermark includes information used for tamper-proofing the image to allow for identifying a modified image or modified information associated with the image.

81. An apparatus for processing an image of a biometric, comprising:
a gradient edge detector configured to detect structural features in a biometric based on data representing an image of at least a portion of the biometric; and
a modeler configured to form a model of the image as a function of the detected structural features wherein the modeler is configured to model at least one region of the image of the at least one portion of the biometric.

82. The apparatus according to claim 81 wherein the modeler is configured to construct the model for at least two resolutions.

83. The apparatus according to claim 82 wherein the resolutions include an outline model at a low resolution and a details model at a high resolution 84. The apparatus according to claim 83 wherein the biometric is an area of skin, with a friction ridge pattern and the outline model includes edge topology of ridge features, and the details model includes edge topology and specifics of ridge deviations and locations and sizes of pores.

85. The apparatus according to claim 82 wherein the resolutions include an outline model at a low resolution, a details model at a high resolution, and a fine details model used to locate and define particular biometric features more accurately than at the low or high resolutions.

86. The apparatus according to claim 82 wherein the biometric is an area of skin with a friction ridge pattern and the modeler includes an identifier, outliner, and extractor to determine ridge deviation detail and pore features.

87. The apparatus according to claim 86 wherein the ridge deviation detail includes ridge contours including scars; and the pore features include position, shape, and sizes of pores.

88. The apparatus according to claim 82 wherein the biometric includes at least one of the following:
ear shape and structure, facial or hand thermograms, iris or retina structure, handwriting, fingerprints, palm prints, or toe prints.

89. The apparatus according to claim 81 wherein a gradient is estimated for each pixel of the model after applying a noise filter to the image.

90. The apparatus according to claim 81 wherein the detector includes a finite differences processor.

91. The apparatus according to claim 81 wherein the detector is configured to:
after gradients have been calculated, identify and mark an image point as an edge point having a locally maximal gradient in the direction of the gradient that exceeds a threshold value;
identify neighboring edge points by finding nearest pixels to the original edge point that lie in a direction that is approximately perpendicular to the gradient direction that passes through the first edge point;
for the nearest pixels, determine gradient values and, for the pixel with a gradient that is maximal along its gradient direction and has a value that exceeds a threshold, assign the pixel to be the next edge point;
continue either until the edge is terminated or the edge closes with itself to form a continuous curve;
terminate the process at the previously determined edge point if the gradient of the candidate edge point is less than the threshold; and
repeat the process until all potential edge points have been considered.

92. The apparatus according to claim 81 wherein the detector is configured to automatically distinguish biometric features from noise.

93. The apparatus according to claim 92 wherein the detector is configured to characterize noise as a biometric feature that is below a minimum width or extends less than a minimum distance.

94. The apparatus according to claim 81 further including a manual editing mechanism in communication with the detector to support manual editing of features and selecting of features that must be present for a successful match.

95. The apparatus according to claim 81 wherein the modeler is configured to model overlapping portions of multiple regions.

96. The apparatus according to claim 81 wherein the modeler is configured to allow a user to add, extend, or delete features.

97. The apparatus according to claim 81 wherein the modeler is configured to allow a user to identify features that must be present for a match.

98. The apparatus according to claim 81 wherein the modeler is configured to allow the user to adjust the size or position of the model relative to the biometric.

99. The apparatus according to claim 81 wherein the image is a previously stored image; and
the modeler is configured to normalize a size of the image as a function of a scale associated with the image.

100. The apparatus according to claim 81 wherein the biometric is an area of skin with a friction ridge pattern and the features include ridge structure with ridge deviation detail.

101. The apparatus according to claim 81 further including a display in communication with the modeler configured to display the image to a user with an overlay of indications of the biometric features of the image.

102. The apparatus according to claim 81 further including a display in communication with the modeler configured to display the image to a user with an overlay of indications of filtered biometric features according to a selectable criteria.

103. The apparatus according to claim 81 further including an image manipulator configured to automatically rotate the image to a specified orientation for displaying to a user.

104. The apparatus according to claim 81 wherein the image is a gray-scale image.

105. The apparatus according to claim 81 further including a database that stores the image of the at least a portion of the biometric.

106. The apparatus according to claim 105 wherein the database stores the image and the model of the image.

107. The apparatus according to claim 105 wherein the database stores the image at full sampled resolution.

108. The apparatus according to claim 105 further including a compressor that compresses the data representing the image prior to storing in the database.

109. The apparatus according to claim 108 wherein the compressor compresses the image in a lossless manner.

110. The apparatus according to claim 105 wherein the compressor compresses the model prior to storing the image in the database.

111. The apparatus according to claim 105 further including an encryption unit that encrypts the data or model prior to storing the image in the database.

112. The apparatus according to claim 105 wherein the database stores the image and the model of the at least a portion of the biometric with associated information.

113. The apparatus according to claim 112 wherein the associated information includes at least one of:
identity of a person associated with the biometric;
manufacturer, model, or serial number of the instrument supplying the data representing the portion of the biometric;
date of imaging the biometric;
time of day of imaging the biometric;
calibration data associated with the instrument used to acquire the image;
temperature at the time of acquiring the image;
photograph, voice recording, or signature of the person whose biometric is imaged;
watermark;
unique computer ID of the computer receiving the data representing the image from the instrument acquiring the image of the biometric; or
name of person logged into the computer at the time of acquiring the image.

114. The apparatus according to claim 112 wherein the associated information includes a photograph, voice recording, or signature of the person whose biometric is imaged.

115. The apparatus according to claim 112 wherein the associated information is a watermark.

116. The apparatus according to claim 115 wherein the watermark is identifying information.

117. The apparatus according to claim 115 wherein the watermark includes anti-tampering information.

118. The apparatus according to claim 81 further including an input unit that provides a present image, a database that stores previously acquired images and associated models, and a comparison unit that compares a previously stored model from a database to a present image.

119. The apparatus according to claim 118 wherein the present image is at least a portion of a biometric of a person having a known identity.

120. The apparatus according to claim 118 wherein the present image is at least a portion of a biometric of a person having an unknown identity.

121. The apparatus according to claim 118 wherein the present image is received from one of the following sources: live source, local database, image scanner, or other source.

122. The apparatus according to claim 118 wherein the comparison unit compares outline features of the previously stored model to outline features of the present image to determine (i) whether the present image is a candidate for a match or (ii) whether the previously stored model is a candidate for a match.

123. The apparatus according to claim 122 wherein the comparison unit determines whether the comparison exceeds a predetermined candidate threshold.

124. The apparatus according to claim 122 wherein, if the present image is not a candidate for a match, the comparison unit compares outline features of a next previously stored model to the outline features of the present image to determine whether the present image is a candidate for a match and if so, uses the next previously stored model for details comparison.

125. The apparatus according to claim 122 wherein, if the previously stored model is not a candidate for a match, the comparison unit compares outline features of a next previously stored model to the outline features of the present image to determine whether the next previously stored model is a candidate for a match and if so, uses the next previously stored model for details comparison.

126. The apparatus according to claim 122 wherein, if a candidate match of outline features is found, the comparison unit compares details features of the previously stored model with details features of the present image.

127. The apparatus according to claim 126 wherein the comparison unit further determines whether the details comparison exceeds a predetermined threshold.

128. The apparatus according to claim 126 wherein the comparison unit further determines whether required features associated with the previously stored model are found in the present image.

129. The apparatus according to claim 126 wherein the biometric is an area of skin with a friction ridge pattern and the comparison unit compares details features, wherein the comparison unit determines whether pore features in the previously stored model are found in the present image.

130. The apparatus according to claim 129 wherein the detector indicates which pores in the previously stored model appear in expected locations in the present image, the detector allowing for distortions that normally occur between successive impressions.

131. The apparatus according to claim 130 wherein the detector further indicates a pore count or a statistical probability of an error in at least cases allowing for distortion.

132. The apparatus according to claim 126 wherein the comparison unit further determines whether the details comparison exceeds a predetermined threshold a specified number of consecutive frames.

133. The apparatus according to claim 132 wherein the details features in successive frames are different.

134. The apparatus according to claim 132 wherein the comparison unit selects another details feature set of the previously stored model for correlating with another details feature set of the present image.

135. The apparatus according to claim 132 wherein the comparison unit (i) selects another previously stored model for correlating with a feature set of the present image and (ii) declares a successful match if any model exceeds a predetermined threshold.

136. The apparatus according to claim 118 wherein the comparison unit compares outline features of the previously stored model to outline features of a model of the present image and, if the comparison exceeds a predetermined threshold, compares details features of the previously stored model to details features of the model of the present image to determine whether the previously stored model and the present image match.

137. The apparatus according to claim 118 wherein the comparison unit scales the previously stored model, present image, or model of the present image.

138. The apparatus according to claim 118 wherein the comparison unit rotates the previously stored model, present image, or present model.

139. The apparatus according to claim 118 wherein the comparison unit adaptively conforms the previously stored model to account for variability associated with recording or acquiring the present image.

140. The apparatus according to claim 139 wherein the comparison unit accounts for variability by accounting for an expected location of predefined features.

141. The apparatus according to claim 139 wherein the variability includes stretching of the biometric or portions thereof laterally, longitudinally, or radially.

142. The apparatus according to claim 139 wherein the variability is caused by pressure of the biometric on a medium used to record or acquire the present image.

143. The apparatus according to claim 118 wherein the comparison unit compares the previously stored model against multiple present images until a match is found or comparison with the multiple present images is complete.

144. The apparatus according to claim 118 wherein the comparison unit compares multiple previously stored models against the present image until a match is found or comparison with the multiple previously stored models is complete.

145. The apparatus according to claim 118 wherein the comparison unit compares multiple previously stored models against multiple present images until comparing the multiple previously stored models is complete.

146. The apparatus according to claim 118 wherein the present image includes multiple areas of skin with a friction ridge pattern of an individual.

147. The apparatus according to claim 118 wherein the multiple biometrics are different areas of skin with a friction ridge pattern from the same individual.

148. The apparatus according to claim 81 further including a comparison unit that compares previously stored models of multiple biometrics to present images of multiple, respective biometrics.

149. The apparatus according to claim 148 wherein the comparison unit further determines a combined metric based on the comparisons.

150. The apparatus according to claim 81 further including a preprocessor in communication with the detector that preprocesses the data representing the image.

151. The apparatus according to claim 150 wherein the preprocessor subsamples the at least a portion of the biometric to produce the data representing the image.

152. The apparatus according to claim 150 wherein the preprocessor decimates the data representing the image.

153. The apparatus according to claim 150 wherein the preprocessor bins the data representing the image.

154. The apparatus according to claim 150 wherein the preprocessor corrects for uneven imaging of the at least a portion of the biometric.

155. The apparatus according to claim 150 wherein the preprocessor accounts for defective pixels of an instrument used to acquire the at least a portion of the biometric.

156. The apparatus according to claim 150 wherein the preprocessor encrypts the data representing the image.

157. The apparatus according to claim 150 wherein the preprocessor changes the image orientation by flipping the image vertically or horizontally or by rotating the image.

158. The apparatus according to claim 150 wherein the preprocessor attaches sensor information to the data representing the image.

159. The apparatus according to claim 150 wherein the preprocessor applies a watermark to the data representing the image.

160. The apparatus according to claim 159 wherein the watermark includes information used for tamper-proofing the image to allow for identifying a modified image or modified information associated with the image.

161. An apparatus for processing an image of a biometric, comprising:
gradient edge detection means for detecting features in a biometric based on data representing an image of at least a portion of the biometric;
means for modeling the image as a function of the features; and
means for displaying the image to a user with an overlay of the indications of the biometric features of the image.

162. A method for processing an image of a biometric, comprising:
acquiring data representing features of an image of at least a portion of a biometric using a data acquisition unit; and
forming a model of the image using the features of the biometric for at least two resolutions using a modeler wherein the resolutions include an outline model at a low resolution, a details model at a high resolution, and a fine details model used to locate and define particular biometric features more accurately than at a low or high resolution.

163. The method according to claim 162 wherein the biometric is an area of skin with a friction ridge pattern, the outline model includes edge topology of ridge features, and the details model includes edge topology and specifics of ridge deviations and locations and sizes of pores.

164. The method according to claim 162 wherein forming a model of the image includes applying a gradient edge detection process.

165. The method according to claim 162 wherein the biometric includes at least one of the following:
ear shape and structure, facial or hand thermograms, iris or retina structure, handwriting, fingerprints, palm prints, foot prints, or toe prints.

166. The method according to claim 162 further including storing the image and model in a database with associated information, including at least one of the following:
identity of a person associated with the biometric;
manufacturer, model, or serial number of the instrument supplying the data representing the portion of the biometric;
date of imaging the biometric;
time day of imaging the biometric;
calibration data associated with the instrument used to acquire the image;
temperature at the time of acquiring the image;
photograph, voice recording, or signature of the person whose biometric is imaged;
watermark;
unique computer ID of the computer receiving the data representing the image of the biometric; or
name of person logged into the computer at the time of acquiring the image.

167. The method according to claim 162 further including comparing a previously stored model from a database to a present image.

168. The method according to claim 167 wherein the present image is at least a portion of a biometric of a person having a known identity or having an unknown identity.

169. The method according to claim 167 wherein, if a candidate match of outline features is found, the method further includes comparing details features of the previously stored model with details features of the present image.

170. The method according to claim 167 wherein the comparing includes adaptively conforming the previously stored model to account for variability associated with recording or acquiring the present image.

171. The method according to claim 162 further including preprocessing the data, wherein the preprocessing includes at least one of the following:
subsampling the at least a portion of the biometric to produce the data representing the image;
decimating the data representing the image;
binning the data representing the image;
correcting for uneven imaging of the at least a portion of the biometric;
accounting for defective pixels of an instrument used to acquire the at least a portion of the biometric;
encrypting the data representing the image;
changing the image orientation by flipping the image vertically or horizontally or by rotating the image;
attaching sensor information to the data representing the image; or applying a watermark to the data representing the image.

172. An apparatus for processing an image of a biometric, comprising:
a data acquisition unit configured to acquire data representing an image of at least a portion of a biometric; and
a modeler configured to form a model of features of the biometric for at least two resolutions wherein the resolutions include an outline model at a low resolution, a details model at a high resolution, and a fine details model configured to locate and define particular biometric features more accurately than at a low or high resolution.

173. The apparatus according to claim 172 wherein the biometric is an area of skin with a friction ridge pattern, the outline model includes edge topology of ridge features, and the details model includes edge topology and specifics of ridge deviations and locations and sizes of pores.

174. The apparatus according to claim 172 wherein the modeler includes a gradient edge detector to detect biometric features in the image.

175. The apparatus according to claim 172 wherein the biometric includes at least one of the following:
ear shape and structure, facial or hand thermograms, iris or retina structure, handwriting, fingerprints, palm prints, or toe prints.

176. The apparatus according to claim 172 further including a database that stores the image and model with associated information, including at least one of:
identity of a person associated with the biometric;

manufacturer, model, or serial number of the instrument supplying the data representing the portion of the biometric, date of imaging the biometric;

time of day of imaging the biometric;

calibration data associated with the instrument used to acquire the image;

temperature at the time of acquiring the image;

photograph, voice recording, or signature of the person whose biometric is imaged;

watermark;

unique computer ID of the computer receiving the data representing the image from the instrument acquiring the image of the biometric; or name of person logged into the computer at the time of acquiring the image.

177. The apparatus according to claim 172 further including a comparison unit that compares a previously stored model from a database to a present image.

178. The apparatus according to claim 177 wherein the present image is at least a portion of a biometric of a person having a known identity or having an unknown identity.

179. The apparatus according to claim 177 wherein, if a candidate match of outline features is found, the comparison unit compares details features of the previously stored model with details features of the present image.

180. The apparatus according to claim 177 wherein the comparison unit adaptively conforms the previously stored model to account for variability associated with recording or acquiring the present image.

181. The method according to claim 172, further including a preprocessor that preprocesses the data, the preprocessor including at least one of the following components:

a subsampler that subsamples the at least a portion of the biometric to produce the data representing the image;

a decimator that decimates the data representing the image;

a binning unit that bins the data representing the image;

a field flattener that corrects for uneven imaging of the at least a portion of the biometric;

a defective pixel correction unit that accounts for defective pixels of an instrument used to acquire the at least a portion of the biometric;

an encryption unit that encrypts the data representing the image;

an image orientation unit that changes the orientation by flipping the image vertically or horizontally or by rotating the image;

a sensor data application unit that attaches sensor information to the data representing the image; or a watermark application unit that applies a watermark to the data representing the image.

182. An apparatus for processing an image of a biometric, comprising:

means for acquiring data representing an image of at least a portion of a biometric; and means for forming a model of features of the biometric for at least two resolutions wherein the resolutions include an outline model at a low resolution, a details model at a high resolution, and a fine details model configured to locate and define particular biometric features more accurately than at a low or high resolution.

* * * * *